US009749681B2

(12) United States Patent
Suh et al.

(10) Patent No.: US 9,749,681 B2
(45) Date of Patent: *Aug. 29, 2017

(54) NON-REAL-TIME BROADCAST SERVICE PROCESSING SYSTEM AND PROCESSING METHOD THEREOF

(71) Applicant: LG ELECTRONICS INC., Seoul (KR)

(72) Inventors: Jong Yeul Suh, Seoul (KR); Joon Hui Lee, Seoul (KR); Jin Pil Kim, Seoul (KR); Kwan Suk Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/943,232

(22) Filed: Nov. 17, 2015

(65) Prior Publication Data
US 2016/0073156 A1 Mar. 10, 2016

Related U.S. Application Data

(63) Continuation of application No. 13/583,795, filed as application No. PCT/KR2011/001741 on Mar. 11, 2011, now Pat. No. 9,215,493.
(Continued)

(51) Int. Cl.
*H04N 21/81* (2011.01)
*H04N 13/00* (2006.01)
(Continued)

(52) U.S. Cl.
CPC ..... *H04N 21/4345* (2013.01); *H04N 13/0059* (2013.01); *H04N 13/0066* (2013.01);
(Continued)

(58) Field of Classification Search
CPC .......... H04N 21/4345; H04N 13/0059; H04N 13/0066; H04N 21/2362; H04N 21/816;
(Continued)

(56) References Cited

U.S. PATENT DOCUMENTS 8,250,619 B2 8/2012 Song et al.
2006/0023732 A1* 2/2006 Vedantham .......... H04L 1/1628
370/432
(Continued)

FOREIGN PATENT DOCUMENTS

KR 10-0737137 7/2007
KR 10-2009-0109284 10/2009
(Continued)

OTHER PUBLICATIONS

"ATSC Standard: Non-Real-Time Content Delivery", Doc. A/103:2011, May 9, 2012.

*Primary Examiner* — Benjamin R Bruckart
*Assistant Examiner* — Jen-Shi Huang
(74) *Attorney, Agent, or Firm* — Dentons US LLP

(57) ABSTRACT

The present invention relates to a non-real-time broadcast service processing system and a processing method thereof. According to the present invention, the method for processing a non-real-time (NRT) service in a broadcast receiver enables the NRT service to be processed with the following steps: receiving a broadcast service and signaling information; identifying whether the broadcast service is the NRT service on the basis of the signaling information; and identifying whether the identified NRT service includes a 3D service or a 3D content.

1 Claim, 20 Drawing Sheets

Related U.S. Application Data

(60) Provisional application No. 61/432,574, filed on Jan. 13, 2011, provisional application No. 61/313,121, filed on Mar. 11, 2010.

(51) Int. Cl.
*H04N 21/2362* (2011.01)
*H04N 21/433* (2011.01)
*H04N 21/434* (2011.01)

(52) U.S. Cl.
CPC ..... *H04N 21/2362* (2013.01); *H04N 21/4334* (2013.01); *H04N 21/816* (2013.01)

(58) Field of Classification Search
CPC ............. H04N 21/435; H04N 21/2355; H04N 21/23614
See application file for complete search history.

(56) References Cited

U.S. PATENT DOCUMENTS

| | | | |
|---|---|---|---|
| 2009/0320087 A1* | 12/2009 | Song | H04N 7/163 |
| | | | 725/131 |
| 2010/0141738 A1* | 6/2010 | Lee | H04H 20/57 |
| | | | 348/43 |
| 2011/0004908 A1 | 1/2011 | Eyer | |
| 2013/0014163 A1 | 1/2013 | Park | |

FOREIGN PATENT DOCUMENTS

| KR | 10-2009-0127826 A | 12/2009 |
|---|---|---|
| KR | 10-2009-0127839 | 12/2009 |

* cited by examiner

FIG. 6

| Syntax | No. of Bits | Format |
|---|---|---|
| NRT_service_map_table_section() { | | |
|   table_id | 8 | 0xDB |
|   section_syntax_indicator | 1 | '0' |
|   private_indicator | 1 | '1' |
|   reserved | 2 | '11' |
|   section_length | 12 | uimsbf |
|   table_id_extension { | | |
|     SMT_protocol_version | 8 | uimsbf |
|     reserved | 8 | uimsbf |
|   } | | |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   num_NRT_services | 8 | uimsbf |
|   for (i=0; i<num_NRT_services; i++) | | |
|   { | | |
|     reserved | 4 | '1111' |
|     service_status | 2 | uimsbf |
|     SP_indicator | 1 | bslbf |
|     CP_indicator | 1 | bslbf |
|     service_id | 16 | uimsbf |
|     short_service_name | 8*8 | |
|     2D_or_3D_service_exist_flag | 1 | bslbf |
|     reserved | 1 | '1' |
|     service_category | 6 | uimsbf |
|     num_components | 5 | uimsbf |
|     IP_version_flag | 1 | bslbf |
|     source_IP_address_flag | 1 | bslbf |
|     service_destination_IP_address_flag | 1 | bslbf |
|     if(source_IP_address_flag) | | |
|       source_IP_address | 32 or 128 | uimsbf |
|     if(service_destination_IP_address_flag) | | |
|       service_destination_IP_address | 32 or 128 | uimsbf |
|     for (j=0; j<num_components; j++) | | |
|     { | | |
|       reserved | 1 | '1' |
|       essential_component_indicator | 1 | bslbf |
|       component_destination_IP_address_flag | 1 | bslbf |
|       port_num_count | 5 | uimsbf |
|       component_destination_UDP_port_num | 16 | uimsbf |
|       if (component_destination_IP_address_flag) | | |
|         component_destination_IP_address | 32 or 128 | uimsbf |
|       Reserved | 4 | '1111' |
|       num_component_level_descriptors | 4 | uimsbf |
|       for (k=0; k<num_component_level_descriptors; k++) | | |
|       { | | |
|         component_level_descriptor() | var | |
|       } | | |
|     } | | |
|     reserved | 4 | '1111' |
|     num_service_level_descriptors | 4 | uimsbf |
|     for (m=0; m<num_service_level_descriptors; m++) { | | |
|       service_level_descriptor() | var | |
|     } | | |
|   } | | |
|   reserved | 4 | '1111' |
|   num_subnet_level_descriptors | 4 | uimsbf |
|   for (n=0; n<num_subnet_level_descriptors; n++) { | | |
|     subnet_level_descriptor() | var | |
|   } | | |
| } | | |

FIG. 7

| Syntax | No. of Bits | Format |
|---|---|---|
| NRT_component_data() { | | |
|    3D_structure | 8 | uimsbf |
|    LR_first | 1 | bslbf |
|    3D_orientation | 2 | uimsbf |
|    TSI | 16 | uimsbf |
|    session_start_time | 32 | uimsbf |
|    session_end_time | 32 | uimsbf |
|    reserved | 5 | '11111' |
|    tias_bandwidth_indicator | 1 | bslbf |
|    as_bandwidth_indicator | 1 | bslbf |
|    FEC_OTI_indicator | 1 | bslbf |
|    if(tias_bandwidth_indicator == '1') { | | |
|       tias_bandwidth | 16 | uimsbf |
|    } | | |
|    if(as_bandwidth_indicator == '1') { | | |
|       as_bandwidth | 16 | uimsbf |
|    } | | |
|    if(FEC_OTI_indicator == '1') { | | |
|      FEC_encoding_id | 8 | uimsbf |
|      FEC_instance_id | 16 | uimsbf |
|    } | | |
| } | | |

FIG. 8

| Syntax | No.of Bits | Format |
|---|---|---|
| capabilities_descriptor() { | | |
|     descriptor_tag | 8 | 0xC5 |
|     descriptor_length | 8 | uimsbf |
|     descriptor_code_count | 8 | uimsbf |
|     for (i=0; i<capability_code_count; i++) { | | |
|         essential_indicator | 1 | bslbf |
|         capability_code | 7 | uimsbf |
|         if (capability_code > 0x6F) { | | |
|             format_identifier | 32 | uimsbf |
|         } | | |
|     } | | |
|     capability_string_count | 8 | uimsbf |
|     for (i=0; i<capability_string_count; i++) { | | |
|         essential_indicator | 1 | |
|         capability_category_code | 7 | uimsbf |
|         capability_string_length | 8 | uimsbf |
|         capability_string() | var | |
|     } | | |
|     for (j=0; j< N; j++) { | | |
|         reserved | 8 | bslbf |
|     } | | |
| } | | |

FIG. 9

| Syntax | No.of Bits | Format |
|---|---|---|
| NRT_service_descriptor() { | | |
|     descriptor_tag | 8 | 0xTBD |
|     descriptor_length | 8 | uimsbf |
|     reserved | 2 | '11' |
|     service_category | 6 | uimsbf |
|     essential_type_code_count | 8 | uimsbf |
|     for (i=0; i<essential_type_code_count; i++) { | | |
|         essential_type_code | 8 | uimsbf |
|     } | | |
|     for (j=0; j< N; j++) { | | |
|         reserved | 8 | bslbf |
|     } | | |
| } | | |

FIG. 10

| Syntax | No. of Bits | Format |
|---|---|---|
| 3D_NRT_descriptor() { | | |
|   descriptor_tag | 8 | 0xTBD |
|   descriptor_length | 8 | uimsbf |
|   reserved | 2 | '11' |
|   3D_structure | 4 | uimsbf |
|   3D_metadata_exist_flag | 1 | bslbf |
|   reserved | 3 | '111' |
|   3D_sampling | 4 | uimsbf |
|   3D_orientation | 2 | Uimsbf |
|   reserved | 2 | '11' |
|   if(3D_metadata_exist_flag='1') { | | |
|     3D_metadata_type | 3 | uimsbf |
|     3D_metadata_length | 5 | uimsbf |
|     for (i=0; i<3D_metadata_length; i++) { | | |
|       3D_metadata[i] | 16 | uimsbf |
|     } | | |
|   } | | |
| } | | |

FIG. 11

| 3D_structure | Meaning |
|---|---|
| 0000 | Full resolution Left & Right |
| 0001 | Field alternative |
| 0010 | Line alternative |
| 0011 | Reserved |
| 0100 | L + depth |
| 0101 | Reserved |
| 0110 | Top and bottom |
| 0111 | Frame sequential |
| 1000 | Side-by-side |
| 1001 ~ 1111 | Reserved |

FIG. 12

| 3D_structure | Meaning | |
|---|---|---|
| 0000 | subsampling | Odd / Left, Odd / Right |
| 0001 | | Odd / Left, Even / Right |
| 0010 | | Even / Left, Odd / Right |
| 0011 | | Even / Left, Even / Right |
| 0100 | Quincunx matrix | Odd / Left, Odd / Right |
| 0101 | | Odd / Left, Even / Right |
| 0110 | | Even / Left, Odd / Right |
| 0111 | | Even / Left, Even / Right |
| 1000 ~ 1111 | Reserved | |

FIG. 13
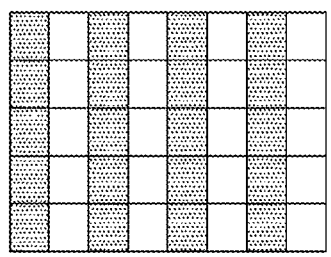
(a)
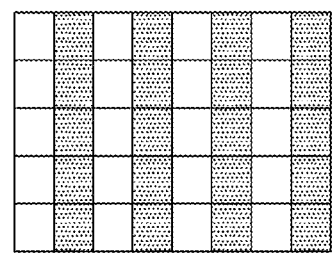
(b)
FIG. 14
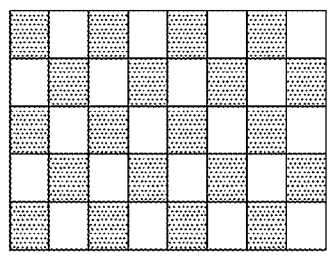
(a)
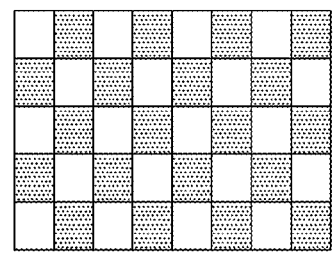
(b)

FIG. 15

| 3D_orientation | Meaning |
|---|---|
| 00 | Left – Normal, Right – Normal |
| 01 | Left – Normal, Right – Inverted |
| 10 | Left – Inverted, Right – Normal |
| 11 | Left – Inverted, Right - Inverted |

FIG. 16

| 3D_metadata_type | 3D_metadata_length | 3D_metadata | Meaning |
|---|---|---|---|
| 000 | 4 | 3D_metadata[0] | parallax_zero |
| | | 3D_metadata[1] | parallax_scale |
| | | 3D_metadata[2] | Dref |
| | | 3D_metadata[3] | Wref |
| 001 | 4 | 3D_metadata[0] | xB |
| | | 3D_metadata[1] | Zref |
| | | 3D_metadata[2] | Dref |
| | | 3D_metadata[3] | Wref |

FIG. 17

| Syntax | No.of Bits | Format |
|---|---|---|
| 2D_3D_corresponding_service_descriptor() { | | |
|     descriptor_tag | 8 | 0xTBD |
|     descriptor_length | 8 | uimsbf |
|     corresponding_NRT_service_id | 16 | uimsbf |

FIG. 18

| Syntax | No. of Bits | Format |
|---|---|---|
| NRT_information_table_section() { | | |
|   table_id | 8 | 0xDF |
|   section_syntax_indicator | 1 | '0' |
|   private_indicator | 1 | '1' |
|   reserved | 2 | '11' |
|   section_length | 12 | uimsbf |
|   table_id_extension { | | |
|     protocol_version | 8 | uimsbf |
|     subnet_id | 8 | uimsbf |
|   } | | |
|   reserved | 2 | '11' |
|   NRT_IT_version_number | 5 | uimsbf |
|   current_next_indicator | 1 | '1' |
|   section_number | 8 | uimsbf |
|   last_section_number | 8 | uimsbf |
|   service_id | 16 | uimsbf |
|   time_span_start | 32 | uimsbf |
|   reserved | 5 | '11111' |
|   time_span_length | 11 | uimsbf |
|   num_content_items_in_section | 8 | uimsbf |
|   for (j=0; j< num_content_items_in_section; j++) { | | |
|     content_linkage | 32 | uimsbf |
|     updates_available | 1 | bslbf |
|     TF_available | 1 | bslbf |
|     content_security_conditions_indicator | 1 | bslbf |
|     available_on_internet | 1 | bslbf |
|     playback_length_included | 1 | bslbf |
|     playback_delay_included | 1 | bslbf |
|     expiration_included | 1 | bslbf |
|     content_length_included | 1 | bslbf |
|     reserved | 4 | '1111' |
|     acquisition_time | 12 | uimsbf |
|     if (playback_length_included==1) { | | |
|       reserved | 4 | '1111' |
|       playback_length_in_seconds | 20 | uimsbf |
|     } | | |
|     if (playback_delay_included==1) { | | |
|       reserved | 4 | '1111' |
|       playback_delay | 20 | uimsbf |
|     } | | |
|     if (expiration_included==1) { | | |
|       expiration | 32 | uimsbf |
|     } | | |
|     if (content_length_included==1) { | | |
|       content_length | 40 | uimsbf |
|     } | | |
|     content_name_length | 8 | uimsbf |
|     content_name_text() | var | |
|     num_content_descriptors_length | 8 | uimsbf |
|     for (i=0; i<num_content_descriptors; i++) { | | |
|       content_descriptor() | var | |
|     } | | |
|     num_descriptors | 8 | uimsbf |
|     for (i=0; i<num_content_descriptors; i++) { | | |
|       descriptor() | var | |
|     } | | |
|   } | | |

FIG. 19

| Syntax | No.of Bits | Format |
|---|---|---|
| media_type_descriptor() { | | |
|     descriptor_tag | 8 | 0xTBD |
|     descriptor_length | 8 | uimsbf |
|     application_type | 8 | uimsbf |
|     media_type_length | 8 | uimsbf |
|     media_type() | var | |
|     for (j=0; j< N; j++) { | | |
|         reserved | 8 | bslbf |
|     } | | |
| } | | |

FIG. 20

| Syntax | No.of Bits | Format |
|---|---|---|
| 2D_3D_corresponding_contents_descriptor() { | | |
|     descriptor_tag | 8 | 0xTBD |
|     descriptor_length | 8 | uimsbf |
|     corresponding_content_linkage | 32 | uimsbf |

FIG. 21

| | Simple Guide | | | |
|---|---|---|---|---|
| SBS | My wife is coming back [2D][3D] | SBS 8 News [2D] | SBS Sports News [2D] |
| KBS | Hometown Report [2D] | The world we live in [2D] | KBS News Desk [2D] |
| EBS | Fairy Princess Sally [3D] | Conceited [2D][3D] | EBS News [2D] |
| MBC | MBC News [2D] | Bulmanzero [2D] | Kick through the roof [2D][3D] |

FIG. 22

| | 12:00 13:00 14:00 15:00 16:00 17:00 18:00 19:00 20:00 21:00 22:00 23:00 |
|---|---|
| SBS | SBS Sports New [2D] |
| | My wife is coming back Episode 22 [2D] |
| | My wife is coming back Episode 22 [3D] |
| KBS | Wang-geon the great, episode 30 [2D] |
| | KBS News Desk [2D] |
| EBS | Fairy pricess sally [2D] |
| | Conceited [2D] |
| MBC | Kick through the roof episode 50 [2D] |
| | Kick through the roof episode 50 [3D] |

FIG. 23

| Syntax | No. of Bits | Format |
|---|---|---|
| Content_labeling_descriptor () { | | |
|     descriptor_tag | 8 | uimsbf |
|     descriptor_length | 8 | uimsbf |
|     metadata_application_format | 16 | uimsbf |
|     if (metadata_application_format==0xFFFF){ | | |
|         metadata_application_format_identifier | 32 | uimsbf |
|     } | | |
|     content_reference_id_record_flag | 1 | bslbf |
|     content_time_base_indicator | 4 | uimsbf |
|     reserved | 3 | bslbf |
|     if (content_reference_id_record_flag == '1'){ | | |
|         content_reference_id_record_length | 8 | uimsbf |
|         for (i=0; i<content_reference_id_record_length; i++){ | | |
|             content_reference_id_byte | 8 | bslbf |
|         } | | |
|     } | | |
|     if (content_time_base_indicator== 1\2){ | - | bslbf |
|         reserved | 33 | uimsbf |
|         content_time_base_value | - | bslbf |
|         reserved | 33 | uimsbf |
|         metadata_time_base_value | | |
|     } | | |
|     if (content_time_base_indicator== 2){ | 1 | bslbf |
|         reserved | - | uimsbf |
|         contentID | | |
|     } | | |
|     if (content_time_base_indicator== 3\4\5\6\7){ | | |
|         time_base_association_data_length | 8 | uimsbf |
|         for (i=0; i<time_base_association_data_length; i++){ | | |
|             reserved | 8 | bslbf |
|         } | | |
|     } | | |
|     for (i=0; i<N; i++){ | | |
|         private_data_byte | 8 | bslbf |
|     } | | |
| } | | |

FIG. 24

| Syntax | No.of Bits | Format |
|---|---|---|
| ATSC_content_identifier() { | | |
|     TSID | 16 | uimsbf |
|     reserved | 2 | bslbf |
|     end_of_day | 5 | uimsbf |
|     unique_for | 9 | uimsbf |
|     content_id | var | |
| } | | |

FIG. 25

| Syntax | No.of Bits | Format |
|---|---|---|
| 2D_3D_corresponding_content_id_descriptor() { | | |
|     descriptor_tag | 8 | 0xTBD |
|     descriptor_length | 8 | uimsbf |
|     corresponding_content_id | var | uimsbf |

FIG. 28

| KBS | Wang-geon the great, episode 30 [3D] | |
| --- | --- | --- |
| | This is the 3d version of Wang-geon the great, episode 30 (recording date: march 10, 2010) [2D] | |
| | Schedule recording | Back |

NON-REAL-TIME BROADCAST SERVICE PROCESSING SYSTEM AND PROCESSING METHOD THEREOF

This application is a continuation of U.S. application Ser. No. 13/583,795, filed Sep. 10, 2012, which claims the benefit of priority of PCT/KR2011/001741 filed on Mar. 11, 2011, U.S. Provisional Application No. 61/313,121 filed on Mar. 11, 2010 and U.S. Provisional Application No. 61/432,574 filed on Jan. 13, 2011, all of which are incorporated by reference in their entirety herein.

TECHNICAL FIELD

The present invention relates to a non-real-time (hereinafter, "NRT") broadcast service processing system and method, and more particularly, to a NRT broadcast service processing system and method capable of identifying and processing 3-dimensional (hereinafter, "3D") content included in an NRT service at a receiving device if the 3D content is transmitted via the NRT service.

BACKGROUND ART

As an application which will be used in a digital television (DTV) service in the future, there is an NRT service. The NRT service involves non-real-time transmission, storage and viewing operations, instead of real-time streaming, transmits content in the form of a file via a redundant bandwidth using a terrestrial broadcast medium, and is expected to implement various service functions such as push video on demand (VOD) or targeted advertising.

DISCLOSURE

Technical Problem

An object of the present invention is to identify and process 3D content included in an NRT service at a receiving device while identifying the NRT service, if the 3D content is transmitted via the NRT service.

Another object of the present invention is to provide presence/absence of 3D NRT content in an NRT service through an electronic program guide (EPG) of the NRT service, that is, NRT-EPG, detailed information of 3D NRT content, e.g., 3D format information, and enable a receiving device to perform a viewing and recording function of 3D NRT content at a receiving device.

Another object of the present invention is to identify and download a 3D or 2D version corresponding to previously received 2D or 3D content at a receiving device, if the 3D or 2D version corresponding to the previously received 2D or 3D content is present.

Technical Solution

The present invention provides a non-real-time (NRT) broadcast service processing system and method.

The object of the present invention can be achieved by providing a method of processing a non-real-time (NRT) service in a broadcast receiver, the method including receiving a broadcast service and signaling information, identifying whether the broadcast service is an NRT service based on the signaling information and determining whether the identified NRT service includes a 3-dimensional (3D) service or 3D content, and processing the NRT service.

The signaling information may include a service map table (SMT) and an NRT-information table (NRT-IT).

The SMT may use a descriptor of at least one of a component level and a service level in order to determine whether the identified NRT service is a 3D service.

The descriptor of the component level may include a component_descriptor and the component_descriptor may identify whether a 3D video component is included in the NRT service using a component_type.

The component_descriptor may include at least one of information indicating a 3D video format of the video component, information indicating whether a first half is a left picture or a right picture, and information indicating orientation which is a pixel arrangement form of a left view image and a right view image in 3D content of video.

The descriptor of the service level may include at least one of a capability_descriptor and a service_descriptor.

The capability_descriptor may include at least one of information indicating that a media type is 3D video coded through advance video coding (AVC) and information indicating that the media type is 3D video coded through AVC and a 3D format is any one of Side-by-Side (SbS) and Top-and-Bottom (TaB).

The service_descriptor may include any one of information indicating that a service category is 3D browse & download and information indicating 3D push.

The SMT and the NRT-IT may further include flag information indicating whether a service or content corresponding to a specific service or content is present, and a 2D service or content corresponds to a 3D service or content or a 3D service or content corresponds to a second service or content.

The flag information may include any one of information about a current service using 1 bit and information about services of a current time and a different time using 2 bits or more.

The SMT may further include a service-level descriptor providing a service identifier if a corresponding service is present according to the flag information.

The SMT may further include a service-level descriptor including at least one of information indicating a video format of 3D content, information about a frame-compatible format of 3D content, information about orientation which is a pixel arrangement form of a left view image and a right view image in 3D content, and metadata information of 3D content, if the identified 3D NRT service or the corresponding service is 3D.

The NRT-IT may include a content-level descriptor including information indicating that an application type of content is 3D NRT content, if announced content is 3D.

The NRT-IT may further include a content-level descriptor providing content linkage information of corresponding content if corresponding content is present according to the flag information.

The NRT-IT may identify the specific content and the corresponding content at the same time slot using content reference identifier information for uniquely identifying the content.

Advantageous Effects

According to the present invention, the following effects are obtained.

First, it is possible to signal 3D NRT content via an NRT service.

Second, it is possible to check presence/absence of 3D NRT content differentiated from 2D content via NRT-EPG and to perform a function for allowing a user to determine whether 3D NRT content is viewed and a recording/schedule-recording function based on detailed information of the 3D NRT content.

Third, it is possible to automatically download a 3D version of previously received 2D content if the 3D version is present.

DESCRIPTION OF DRAWINGS

FIG. 6 is a diagram illustrating an example of a service map table (SMT) section according to the present invention.

FIG. 7 is a diagram illustrating an example of the bitstream syntax of NRT_component_data_descriptor according to the present invention.

FIG. 8 is a diagram illustrating an example of the bitstream syntax of a capability_descriptor according to the present invention.

FIG. 9 is a diagram illustrating an example of the bitstream syntax of an NRT_service_descriptor according to the present invention.

FIG. 10 is a diagram illustrating an example of the bitstream syntax of a 3D_NRT_descriptor according to the present invention.

FIG. 11 is a diagram illustrating a 3D_structure field value and meaning thereof according to the present invention.

FIG. 12 is a diagram illustrating a 3D_sampling field value and meaning thereof according to the present invention.

FIG. 13 is a diagram illustrating a 3D_orientation field value and meaning thereof according to the present invention.

FIG. 14 is a diagram illustrating meaning of sub-sampling in association with the 3D_sampling field according to the present invention.

FIG. 15 is a diagram illustrating meaning of a quincunx matrix in association with the 3D_sampling field according to the present invention.

FIG. 16 is a diagram illustrating 3D_metadata_type field and 3D_metadata_length field values and meaning thereof according to the present invention.

FIG. 17 is a diagram illustrating an example of the bitstream syntax of a 2D_3D_corresponding_service_descriptor according to the present invention.

FIG. 18 is a diagram illustrating an example of the bitstream syntax of NRT-IT according to an embodiment of the present invention.

FIG. 19 is a diagram illustrating an example of the bitstream syntax of a media_type descriptor according to the present invention.

FIG. 20 is a diagram illustrating an example of the bitstream syntax of a 2D_3D_corresponding_content_descriptor according to the present invention.

FIG. 21 is a diagram showing an example of NRT-EPG according to the present invention.

FIG. 22 is a diagram showing another example of NRT-EPG according to the present invention.

FIG. 23 is a diagram illustrating an example of the bitstream syntax of a content_labeling_descriptor according to the present invention.

FIG. 24 is a diagram illustrating an example of the bitstream syntax of a content_reference_id_byte according to the present invention.

FIG. 25 is a diagram illustrating an example of the bitstream syntax of 2D_3D_corresponding_content_id_descriptor according to the present invention.

FIG. 28 is a diagram showing a detailed example of the UI of FIG. 27.

BEST MODE

Figure 1:
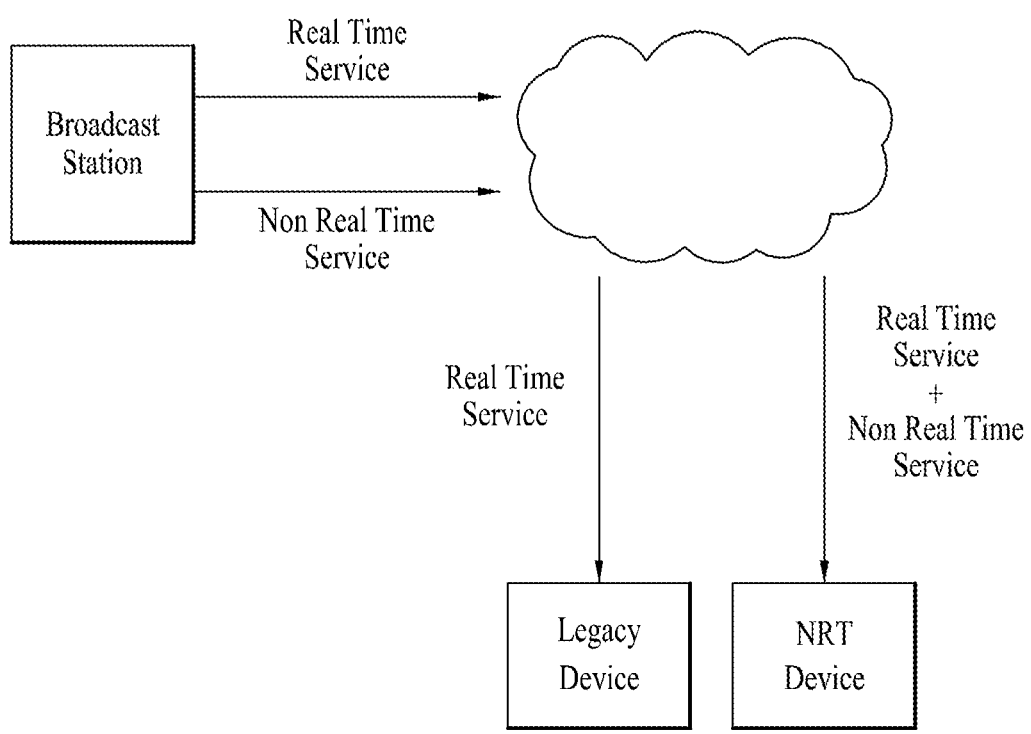
FIG. 1 is a diagram illustrating the concept of an NRT service.

Hereinafter, the exemplary embodiments of the present invention capable of implementing the above objects will be described with reference to the accompanying drawings. The configuration and operation of the present invention shown in the drawings and described hereinafter will be described in at least one embodiment, without limiting the spirit and scope of the present invention.

Definition of the Terms Used in the Present Invention

In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

Hereinafter, in the present specification, the term "non-real time (NRT)" refers to content that is delivered in advance of its use and stored in a receiving device. Content refers to content that is delivered faster than real-time, such that buffering is required in the receiving device.

The term "3D NRT service" refers to a 3-dimensional (3D) service that is provided as an NRT service and may include the case of using an NRT service as a dedicated 3D service and the case in which an NRT service includes at least a part of a 3D service.

The term "3D NRT content" refers to 3D content transmitted via an NRT service.

The term "NRT-EPG" is used to collectively represent a service guide or a program guide that may be provided by a broadcast receiver based on signaling information and announcement information transmitted via a service signaling channel (SSC).

Hereinafter, in the present specification, identification and processing of 3D NRT service or content according to the present invention will be described. The term "processing" may include provision of 3D NRT content by a receiving device, determination as to whether 3D NRT content is present via NRT-EPG and decoding and recording of 3D NRT content at a receiving device based on detailed information (e.g., 3D video format information, etc.) about 3D NRT content. The term "processing" may include all processes necessary for a procedure from transmission and reception of 3D NRT content to provision of 3D NRT content to a user. In the present specification, if a version corresponding to previously received 2D NRT content or 3D NRT content, that is, 3D NRT content or 2D NRT content, is present, a method of providing information about the version and downloading the version will be described. If NRT content is schedule-downloaded or if there is a series of previously received NRT content, information about other series or another episode of the series or content provided by another medium may be further provided. The term "recording" includes various functions which may be provided by a personal video recorder (PVR) or a digital video recorder (DVR), such as instant recording, schedule recording, time machine, which may be performed via NRT-EPG.

NRT Service Conceptual Diagram

FIG. 1 is a diagram illustrating the concept of an NRT service.

A broadcast station transmits a real-time (RT) service according to a conventional method. At this time, the broadcast station may transmit an RT service and provide an NRT service using the bandwidth left after the process of transmitting the RT service. Examples of such an NRT service may include content for news clip, weather information, advertising and push video on demand (VOD).

Operation of a conventional broadcast receiver, that is, a legacy device, is not influenced by an NRT stream included in a channel. Accordingly, the legacy device may not receive an NRT service or may not appropriately process a received NRT service. Accordingly, in the present specification, a broadcast receiver for receiving and processing an NRT service and providing various functions associated with a new service while maintaining compatibility with the legacy device, that is, while providing an RT service, and a method of processing the same are described.

The RT service and the NRT service may be transmitted via the same path or different paths (e.g., channels) and may be transmitted via an MPEG-2 transport packet (TP) or an IP datagram. If an NRT service is transmitted together with an RT service via the same path, the broadcast receiver according to the present invention may identify the NRT service using signaling information and announcement information transmitted via a SSC. In addition, in the present specification, 3D NRT content may also be identified and the identified 3D NRT content may also be processed. Hereinafter, identification and processing of the NRT service and the 3D NRT content according to the present invention will be described in detail. The broadcast station may provide signaling information and allocate at least one unique packet identifier (PID) for identifying the NRT service.

Broadcast Receiver

Figure 2:
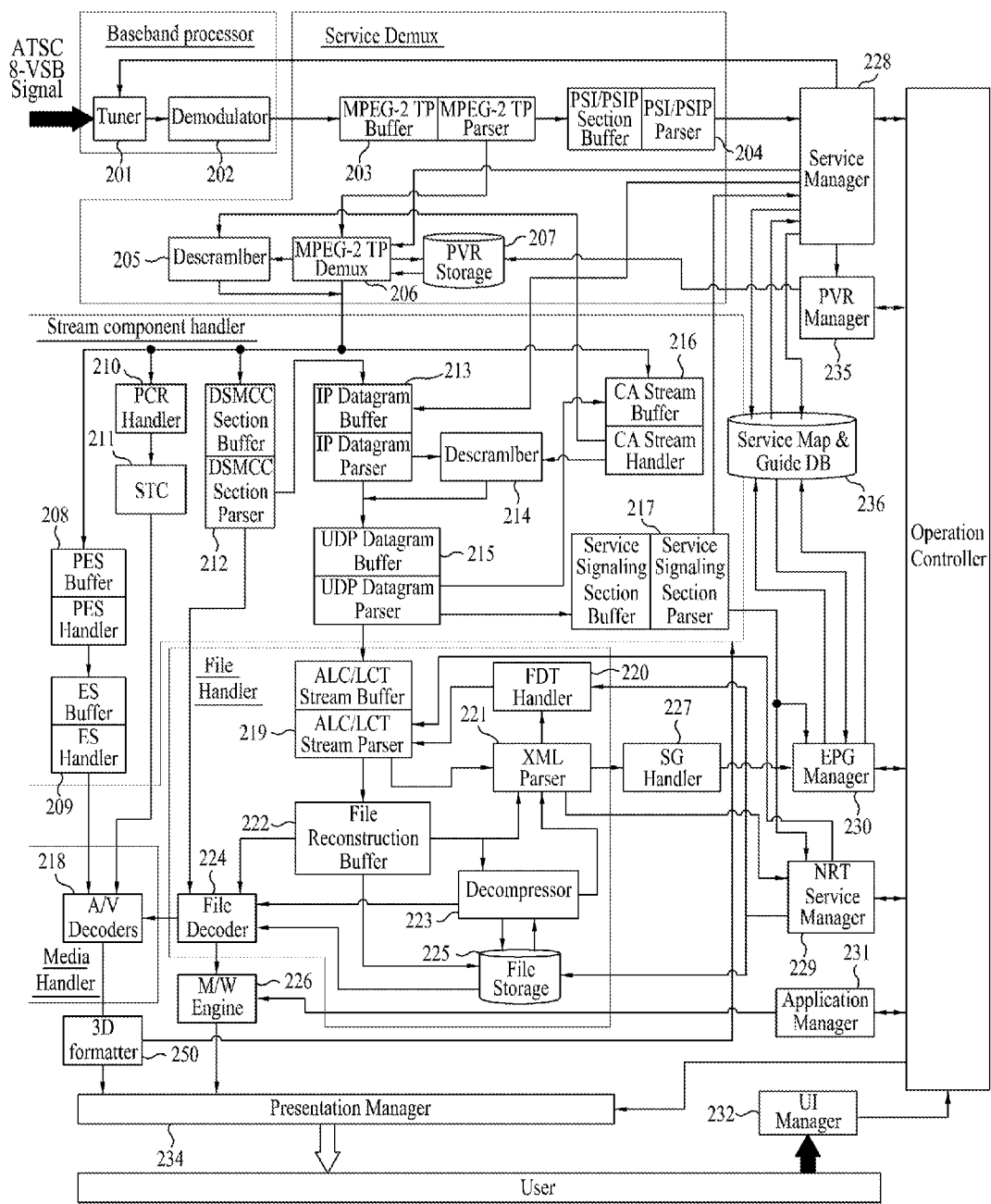
FIG. 2 is a block diagram showing an example of a broadcast receiver according to the present invention.

FIG. 2 is a block diagram showing an example of a broadcast receiver according to the present invention.

An example of an NRT reception system according to the present invention may roughly include a baseband processor, an MPEG-2 service demux, a stream component handler, a file handler, and other parts.

Hereinafter, the components of the NRT reception system of FIG. 2 will be described.

The baseband processor may include a tuner 201 and a demodulator 202. The tuner 201 detects a radio frequency (RF) signal transmitted over the air and extracts symbols. The tuner 201 may be controlled by a service manager 228. The demodulator 202 demodulates the symbols extracted by the tuner 201 to restore meaningful data.

The MPEG-2 service demux includes an MPEG-2 TP buffer/parser 203, a Program Specific Information/Program and System Information Protocol (PSI/PSIP) section/buffer 204, a descrambler 205, an MPEG-2 TP demux 206 and a PVR storage 207.

The MPEG-2 TP buffer/parser 203 buffers and restores an MPEG-2 TP transmitted via a signal and detects and processes a TP header.

The PSI/PSIP section/buffer 204 buffers and parses PSI/PSIP section data transmitted via the MPEG-2 TS. The parsed PSI/PSIP data is collected by a service manager 226 and is stored in a database (DB) in the form of a service map and guide data.

The descrambler 205 restores payload data with respect to scrambled packet payload in the MPEG-2 TP using an encryption key received from a conditional access (CA) stream handler 216.

The MPEG-2 TP demux 206 filters the MPEG-2 TP transmitted via the signal or a TP to be processed by the receiving device in MPEG-2 TPs stored in the PVR storage 207 and delivers the TP to a next processing module. The MPEG-2 TP demux 206 may be controlled by the service manager 228 and the PVR manager 235.

The PVR storage 207 stores the MPEG-2 TP received according to a user request and outputs the MPEG-2 TP according to a user request. The PVR storage 207 is controlled by the PVR manager 235.

The stream component handler may include a Packetized Elementary Stream (PES) Buffer/Handler 208, an Elementary Stream (ES) Buffer/Handler 209, a Program Clock Reference (PCR) Handler 210, an STC unit 211, a digital storage media-command and control (DSM-CC) section Buffer/Handler 212, an IP datagram buffer/header parser 213, a user datagram protocol (UDP) datagram buffer/handler 213, a CA stream buffer/handler 214 and a service signaling section buffer/handler 215.

The PES buffer/handler 208 buffers and restores a PES transmitted via the MPEG-2 TS.

The ES buffer/handler 209 buffers and restores an ES such as audio data or video data transmitted in the form of a PES and delivers the ES to A/V decoders 218.

The PCR handler 210 processes PCR data used for time synchronization of an audio stream and a video stream.

The STC unit 211 corrects clock values of the A/V decoders 218 using a reference clock value received via the PCR handler 210 so as to perform time synchronization.

The DSM-CC section buffer/handler 212 buffers and processes DSM-CC section data, for transmission of a file transmitted via the MPEG-2 TP and IP datagram encapsulation.

The IP datagram buffer/header parser 213 buffers and restores the IP datagram encapsulated via a DSM-CC addressable section and transmitted via the MPEG-2 TP. The IP datagram buffer/header parser 213 parses the header of each datagram through restoration. The IP datagram buffer/header parser 213 may be controlled by the service manager 228.

The descrambler 214 restores payload data with respect to scrambled payload in the received IP datagram using an encryption key received from the CA stream handler 216.

The UDP datagram buffer/handler 215 buffers and restores a UDP datagram transmitted via the IP datagram and parses and processes a UDP header.

The CA stream buffer/handler 216 buffers and processes data such as a descrambling key value such as an entitlement management message (EMM) or an entitlement control message (ECM) transmitted via the MPEG-2 TS or the IP stream for a CA function. The output of the CA stream buffer/handler 216 is delivered to the descrambler 214 so as to perform a decryption operation of the MPEG-2 TS or the IP stream for transmitting AV data and file data.

The service signaling section buffer/parser 217 processes a service map table (SMT), an NRT information table (NRT-IT) and related descriptors for signaling an NRT service according to the present invention. The processed signaling information is transmitted to an NRT service manager 229 and a 3D formatter 250.

The media handler includes A/V decoders 218. The AV decoders 218 compress/decode audio data and video data received from the ES handler 209 in order to present audio and video to a user.

The 3D formatter 250 according to the present invention may receive an image signal decoded by the A/V decoders 218 and reformat a video signal, that is, remap pixels according to pixel arrangement of a 3D display using at least one of signaling information and announcement information received from the service signaling section buffer/parser 217. At this time, 3D related information shown in at least one of FIGS. 7, 10 to 16 may be used as the 3D format information of video.

The file handler may include an Asynchronous Layered Coding/Layered Coding Transport (ALC/LCT) buffer/parser 219, a file description table (FDT) handler 220, an XML parser 221, a file reconstruction buffer 222 and a decompressor 223.

The ALC/LCT buffer/parser 219 buffers and restores ALC/LCT data transmitted via a UDP/IP stream and parses a header of the ALC/LCT and a header extension. The ALC/LCT buffer/parser 219 may be controlled by the NRT service manager 229.

The FDT handler 220 parses and processes a FDT of a File Delivery over Unidirectional Transport (FLUTE) protocol transmitted via an ALC/LCT session. The processed FDT may be transmitted to the NRT service manager 229. The FDT handler 220 may be controlled by the NRT service manager 229.

The XML parser 221 parses an XML document transmitted via the ALC/LCT session and delivers the parsed data to a module such as the FDT handler 220 or the SG handler 227.

The file reconstruction buffer 222 restores a file transmitted via the ALC/LCT and FLUTE session.

The decompressor 223 performs decompression if the file transmitted via the ALC/LCT and FLUTE session is compressed.

The file decoder 224 decodes the file restored by the file reconfiguration buffer 222, the file decompressed by the decompressor 223 or the file extracted from the file storage 225.

The file storage 225 stores and extracts the received file. The received file may include NRT content.

The other parts excluding the above-described components will now be described.

A middleware (M/W) engine 226 processes data such as a file other than an AV stream transmitted via a DSM-CC section, a DSM-CC addressable section and an IP datagram and delivers the processed data to a presentation manager 234.

The SG handler 227 collects and parses service guide data transmitted in the form of an XML document form and delivers the service guide data to the EPG manager 230.

The service manager 228 collects and parses PSI/PSIP data transmitted via the MPEG-2 TS and service signaling section data transmitted via the IP stream, makes a service map, stores the service map in a service map and guide database, and controls access to a desired service of a user.

The service manager 228 is controlled by an operation controller 230 and controls the tuner 201, the MPEG-2 TP demux 206, the IP datagram buffer/handler 213, the NRT service manager 229, etc.

The NRT service manager 229 performs overall management of the NRT service transmitted in the form of an object/file via the FLUTE session on an IP layer. The NRT service manager 229 parses signaling information transmitted from the service signaling section buffer/parser 217. The parsed signaling information may be transmitted to and stored in the service map and guide database 236. In addition, the NRT service manager 229 controls transmission of the SMT and/or the NRT-IT associated with the service guide in the signaling information to the EPG manager 230 and creation of EPG data. The NRT service manager 229 controls the FDT handler 220, the file storage 225, etc. Accordingly, the NRT service manager 229 controls parsing of the FDT received from the FDT handler 220 and storage of NRT content in the file storage 225 in a hierarchical structure. The NRT service manager 229 controls extraction of the NRT content from the file storage 225 when a user selects an NRT service.

The EPG manager 230 controls reception of the service guide data from the SG handler 227 and configuration and display of EPG data.

The application manager 231 performs overall management of processing of application data transmitted in the form of an object or a file.

The UI manager 232 delivers user input to the operation controller 233 via a UI and starts to process a service requested by a user.

The operation controller 233 processes a user command received via the UI manager 232 and enables the manager of a necessary module to perform and manage an action.

The presentation manager 234 provides at least one of audio and video data output from the A/V decoder 218, file data output from the M/W engine 226 and the EPG data output from the EPG manager 230 to the user via a speaker and/or a screen.

Figure 3:
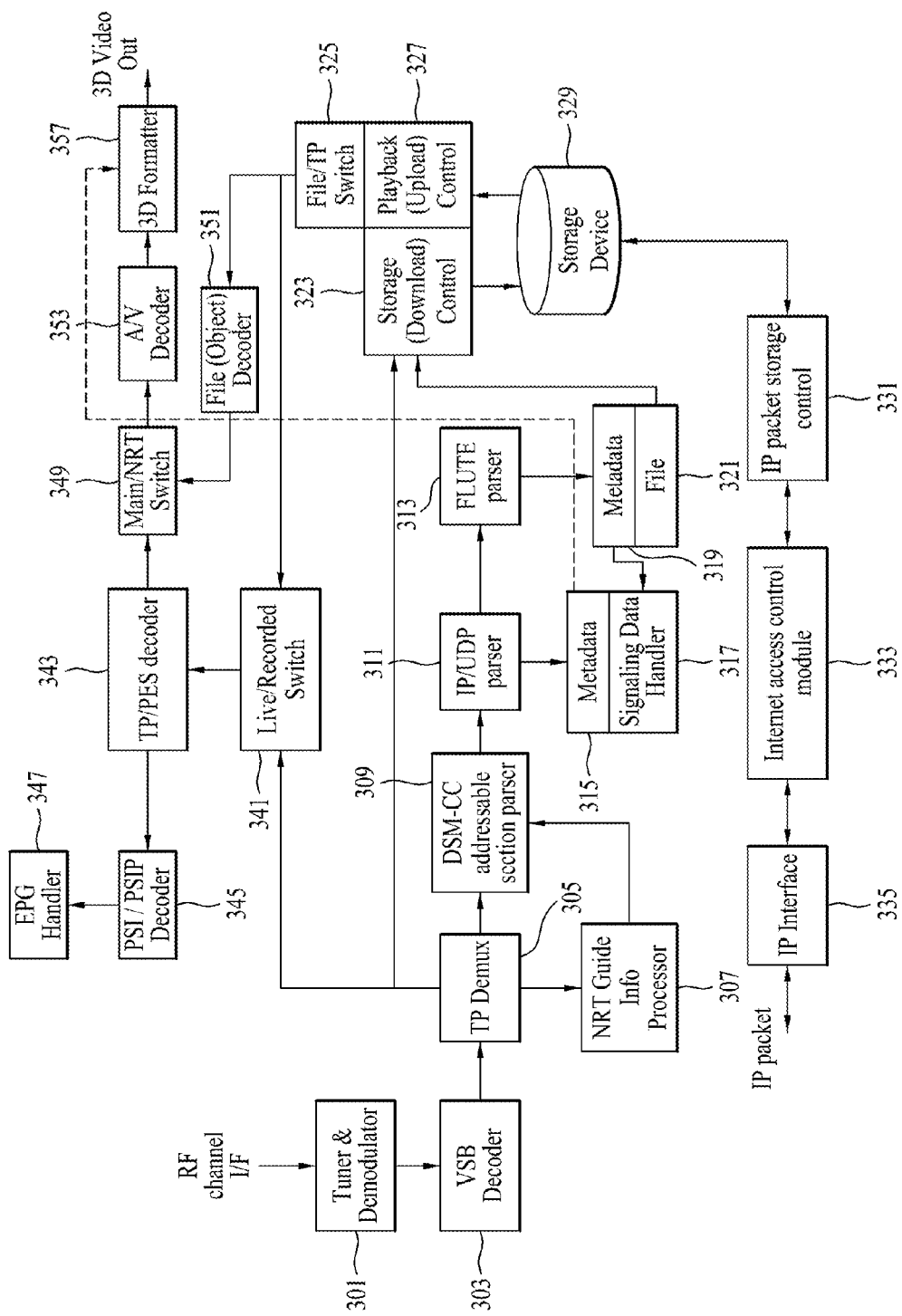
FIG. 3 is a block diagram showing another example of a broadcast receiver according to the present invention.

FIG. 3 is a block diagram showing another example of a broadcast receiver according to the present invention.

The broadcast receiver of FIG. 3 performs a PVR function similarly to the broadcast receiver of FIG. 2 and may perform a function for recording an NRT service or content, a schedule recording function or a time machine function according to the present invention.

Hereinafter, the components of the broadcast receiver of FIG. 3 will be described. In description of the components of FIG. 3, the components equal or similar to the components of FIG. 2 will be omitted.

A tuner and demodulator 301 and a VSB decoder 303 perform the same functions as the baseband processor of FIG. 2, that is, tunes to a specific channel and demodulates a broadcast signal. The received broadcast signal may include an NRT service and the NRT service may include a 3D service or content.

A TP demux 305 appropriately demultiplexes a variety of information included in a TP from the demodulated broadcast signal.

An NRT guide information processor 307 receives the demultiplexed TP from the TP demux 305 and processes the NRT guide information. The processed NRT guide information is input to a DSM-CC addressable section parser 309 and is used to process the demultiplexed TP output from the TP demux 305.

The TP parsed by the DSM-CC addressable section parser 309 is parsed by an IP/UDP parser 311. The parsed IP/UDP packet is parsed by a FLUTE parser 313 and FLUTE data is input to a metadata processor 319.

A storage (download) controller 323 receives the output of the TP demux and the output of the file processor 321 and controls storage and download of the file or TP in a storage device 329 under control of a file/TP switch 325.

A playback (upload) controller 327 controls upload of the file and/or TP stored in the storage device 329 under control of the file/TP switch 325. At this time, the TP of the output of the playback (upload) controller 327 is decoded by a TP/PES decoder 343 via a live/recorded switch 341. In contrast, the file of the output of the playback (upload) controller 327 is decoded by a file (object) decoder 351. The output of the TP/PES decoder 343 and the output of the file (object) decoder 351 are appropriately selected by a main/NRT switch 349 and are decoded by an A/V decoder 353.

If the TP or file decoded by the A/V decoder 353 is 3D data, a 3D formatter 357 formats the TP or file into 3D video based on signaling information received from a metadata handler 315 after signaling data processed by a metadata processor 319 is processed by a signaling data handler 317, and outputs the 3D video.

The metadata handler 315 may process information received from the IP/UDP parser 311 in addition to the metadata processor 319 and transmit the information to the 3D formatter 357.

The 3D formatter 357 may be bypassed if the TP or file decoded by the A/V decoder 353 is 2D data.

The PSI/PSIP decoder receives the TP demultiplexed by the TP demux 305 via the TP/PES decoder 343, reads PSI/PSIP information from the TP/PES and decodes the read PSI/PSIP information.

The decoded PSI/PSIP information is used to configure an EPG in an EPG handler 347.

Description of Relationship Between NRT Service, Content Item and File

Figure 4:
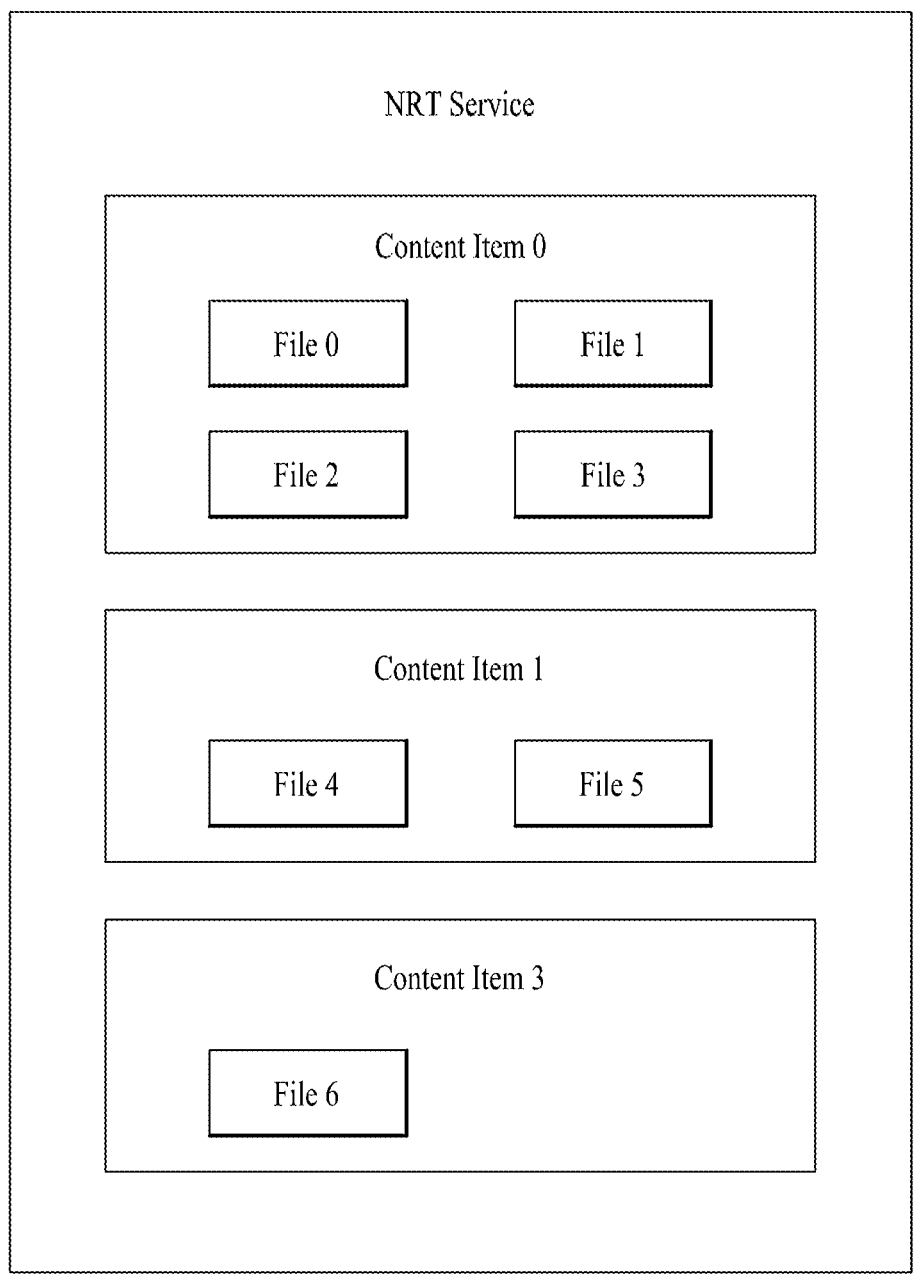
FIG. 4 is a diagram illustrating a relationship between an NRT service, a content item and a file.

FIG. 4 is a diagram illustrating a relationship between an NRT service, a content item and a file.

The NRT service may include one or more content items and a content item may include one or more files. The term "content item" refers to a set of one or more files that an NRT service provider intends to be treated as a single unit for presentation purposes. The content item may correspond to a program or event of an RT broadcast as one entity which can be independently played back. Accordingly, the NRT service refers to a service group as a combination of content items and is equal or similar to the channel concept of RT.

Referring to FIG. 4, an NRT service includes three content items including Content Item 0, Content Item 1 and Content Item 3. Content item 0 includes a total of four files from File 0 to File 3, Content Item 2 includes File 4 and File 5, and Content Item 3 includes only File 6.

As described above, an NRT service differentiated from an RT service needs to be signaled in order to determine whether a service received by a broadcast receiver is an RT service or an NRT service. Hereinafter, a service protocol will be described for describing NRT service signaling.

Protocol for NRT Service

An NRT service is roughly divided into a fixed NRT service for a fixed broadcast and a mobile NRT service for a mobile broadcast. Hereinafter, although an NRT service for a fixed broadcast is described for better understanding of the present invention and convenience of description, the present invention is not limited to the NRT service for the fixed broadcast and is applicable to an NRT service for a mobile broadcast using a similar method.

Figure 5:
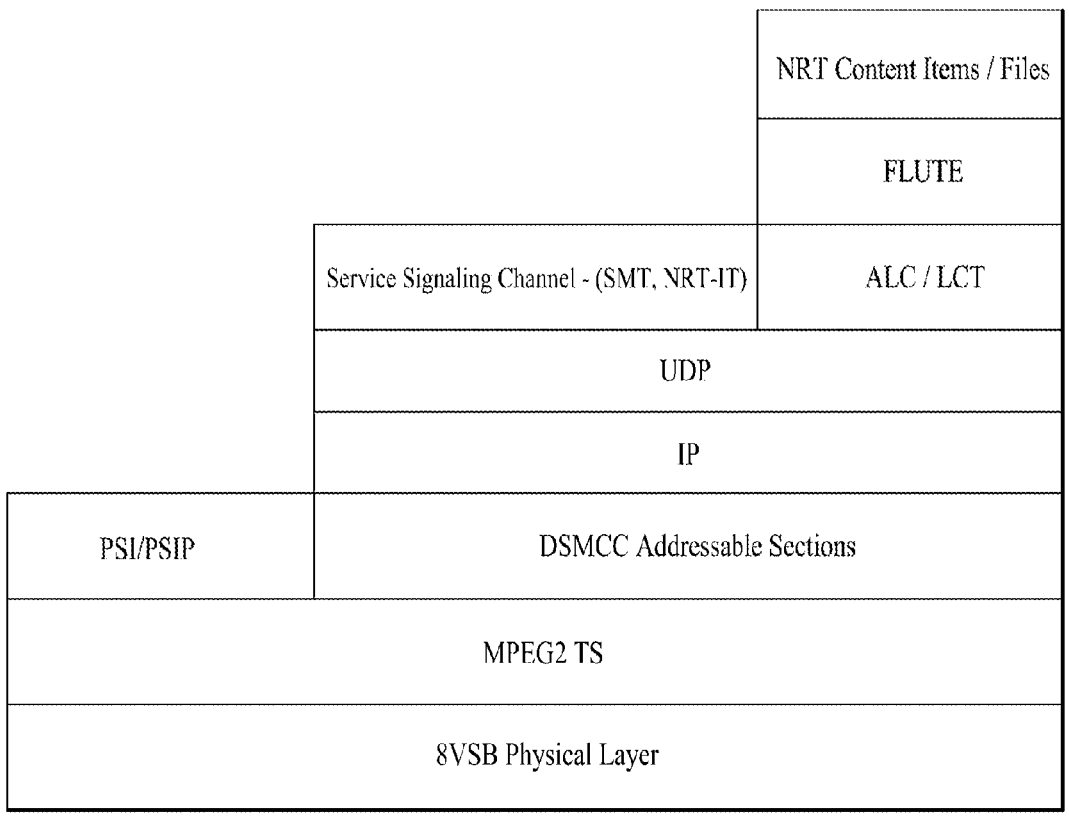
FIG. 5 is a diagram illustrating an example of an NRT service protocol stack according to the present invention.

FIG. 5 is a diagram illustrating an example of an NRT service protocol stack according to the present invention.

In an example of an NRT service protocol stack according to the present invention, an IP datagram including NRT content items/files and a SSC for transmitting an SMT/NRT-IT and PSI/PSIP data are transmitted in an MPEG-2 TS format.

An NRT service for a fixed broadcast is packetized in an Internet Protocol (IP) layer according to a UDP and a UDP packet is packetized according to an IP scheme to become UDP/IP packet data. In the present specification, the packetized UDP/IP packet data is referred to as IP datagram for convenience.

The NRT content items/files are packetized according to a FLUTE scheme and are packetized according to an ALC/LCT scheme. The ALC/LCT packet is transmitted in a state of being encapsulated by a UDP datagram. The ALC/LCT/UDP packet is packetized according to an IP datagram scheme to become an ALC/LCT/UDP/IP packet, that is, IP datagram. The IP datagram is included in the MPEG-2 TS via DSM-CC sections or DSM-CC addressable sections, for transmission. The ALC/LCT/UDP/IP packet is information about a FLUTE session and includes a FDT.

Various tables carried in the SSC, e.g., an SMT and an NRT-IT, are packetized according to a UDP scheme, packetized according to an IP scheme to become UDP/IP packet data, that is, an IP datagram. Such an IP datagram is included in the MPEG-2 TS via DSM-CC sections or DSM-CC addressable sections, for transmission.

The PSI/PSIP table is separately defined and included in the MPEG-2 TS.

The MPEG-2 TS including the NRT content items/files, the SSC and the PSI/PSIP table is modulated using a predetermined transmission scheme, e.g., a vestigial side band (VSB) scheme, and is transmitted.

Hereinafter, the SMT and the NRT-IT transmitted by the SSC and descriptors associated therewith according to the present invention will be described in detail.

SMT (Service Map Table)

FIG. 6 is a diagram illustrating an example of an SMT section according to the present invention.

The SMT contains service-level attributes for NRT Services carried in the fixed-broadcast Transport Stream. The SMT associated with the NRT service includes IP subnet services corresponding to M/H services. In particular, subnet_id shall indicate the IP subnet associated with this SSC. The scope of subnet_id shall be the full main broadcast TS.

A table_id field indicates a type of a table section being defined in SMT for NRT service. In particular, in the present invention, the table_id field may indicate that the table section is an SMT section via a predefined field value.

A section_syntax_indicator field is an indicator indicating the form of the syntax defining the SMT section, e.g., the short form of the MPEG (A section_syntax_indicator field shall be set to 0 to always indicate that this table is derived from the short form of the MPEG-2 private section table).

A private_indicator field indicates that the form of the section follows a private section form (A private_indicator field shall be set to 1).

A section_length fields indicates the number of remaining bytes this table section immediately following this field. The value in this field shall not exceed 4093 (0xFFD).

A table_id_extension field is table-dependent. It shall be considered to be logically part of the table_id field providing the scope for the remaining fields). The table_id_extension fields may include an SMT_protocol_version field. The SMT_protocol_version field indicates a protocol version indicating an NRT service SMT for carrying parameters that may be structured differently than those defined in the current protocol (A SMT_protocol_version field whose function is to allow, in the future, this SMT to carry parameters that may be structured differently from those defined in the current protocol. At present, the value for the protocol_version shall be zero. Non-zero values of protocol_version may be used by a future version of this standard to indicate structurally different tables).

A version_number field includes a version number of an SMT section.

A current_next_indicator field indicates whether the sent SMT is currently applicable (A current_next_indicator, which when set to 1 shall indicate that the sent SMT is currently applicable).

A section_number field shall give the section number of this SMT section.

A last_section_number field shall give the number of the last section (i.e., the section with the highest section_number) of the SMT of which this section is a part.

A num_NRT_services fields specifies the number of NRT services in this SMT section.

The SMT according to the present invention may provide information about an NRT service for a plurality of fixed broadcasts using a loop structure. Hereinafter, the following field information may be defined and provided in the loop structure with respect to the NRT service for each fixed broadcast.

An NRT_service_status field shall identify the status of this NRT Service. The most significant bit (MSB) shall indicate whether this NRT Service is active (when set to 1) or inactive (when set to 0) and the least significant bit (LSB) shall indicate whether this NRT Service is hidden (when set to 1) or not (when set to 0). Hidden services are normally used for proprietary applications, and ordinary receiving devices should ignore the same.

An SP_indicator field shall indicate, when set, that service protection is applied to at least one of the components needed to provide a meaningful presentation of this NRT Service.

A CP_indicator field shall indicate, when set, that content protection is applied to at least one of the components needed to provide a meaningful presentation of this NRT Service.

A service_id field shall uniquely identify this NRT Service within the scope of this NRT Broadcast. The service_id of an NRT service shall not change throughout the life of the service. To avoid confusion, it is recommended that if an NRT service is terminated, then the service_id for the service should not be used for another service until after a suitable interval of time has elapsed.

A short_service_name_length shall indicate the number of byte pairs in the short_service_name field.

A short_service_name specifies a short name of the NRT Service.

A service_category field shall identify the type of service carried in this IP Service.

A num_components field specifies the number of IP stream components in this NRT Service.

An IP_version_flag, when set to 0, shall indicate that source_IP_address, service_destination_IP_address, and component_destination_IP_address fields are IPv4 addresses. The value of 1 for this field is reserved for possible future indication that source_IP_address, service_destination_IP_address, and component_destination_IP_address fields are for IPv6.

A source_IP_address_flag shall indicate, when set, that a source IP address value for this NRT Service is present to indicate a source specific multicast.

A service_destination_IP_address_flag indicates, when set to 1, that a service_destination_IP_address value is present, to serve as the default IP address for the components of this NRT Service.

A source_IP_address field shall be present if the source_IP_address_flag is set to 1 and shall not be present if the source_IP_address_flag is set to 0. If present, this field shall contain the source IP address of all the IP datagrams carrying the components of this NRT Service. Conditional use of the 128 bit-long address version of this field facilitates possible use of IPv6 in the future, although use of IPv6 is not currently defined. The source_IP_address field becomes a source IP address of the same server for sending all channels of a FLUTE session.

A service_destination_IP_address field shall be present if the service_destination_IP_address_flag is set to 1 and shall not be present if the service_destination_IP_address_flag is set to 0. If this service_destination_IP_address is not present, then the component_destination_IP_address field shall be present for each component in the num_components loop. Conditional use of the 128 bit-long address version of this field facilitates possible use of IPv6 in the future, although use of IPv6 is not currently defined. The service_destination_IP_address field is signaled if a destination IP address of a session level of a FLUTE session is present.

The SMT according to the present invention provides information about each component using a loop structure.

An essential_component_indicator, when set to 1, shall indicate that this component is an essential component for the NRT Service. Otherwise, this field indicates that this component is an optional component.

A component_destination_IP_address_flag shall indicate, when set to 1, that the component_destination_IP_address is present for this component.

A port_num_count field shall indicate the number of destination UDP ports associated with this UDP/IP stream component. The values of the destination UDP port numbers shall start from the component_destination_UDP_port_num field and shall be incremented by one.

A component_destination_UDP_port_num field represents the destination UDP port number for this UDP/IP stream component.

A component_destination_IP_address field shall be present if the component_destination_IP_address_flag is set to 1 and shall not be present if the component_destination_IP_address_flag is set to 0. When this field is present, the destination address of the IP datagrams carrying this component of the NRT Service shall match the address in this field. When this field is not present, the destination address of the IP datagrams carrying this component shall match the address in the NRT_service_destination_IP_address field. Conditional use of the 128 bit-long address version of this field facilitates possible use of IPv6 in the future, although use of IPv6 is not currently defined.

A num_component_level_descriptors field represents the number of descriptors providing additional information for an IP stream component.

A component_level_descriptors field identifies one or more descriptors providing additional information for this IP stream component.

A num_service_level_descriptors field specifies the number of NRT service level descriptors for this service.

A service_level_descriptor( ) identifies zero or more descriptors providing additional information for this NRT Service. The service_level_descriptor( ) may indicate the detailed service type of the NRT service. Examples of the detailed service type include a portal service providing web content, push VOD, A/V download, etc.

A num_subnet_level_descriptors field specifies the number of subnet-level descriptors for this subnet.

A subnet_level_descriptor( ) may include zero or more descriptors providing additional information for the subnet which this SMT describes.

According to the present invention, a 2D_or_3D_service_exist_flag field may be further defined with respect to each NRT service using a loop structure according to the number of NRT services defined by the num_NRT_services field.

The 2D_or_3D_serivce_exist_flag field indicates presence/absence of a service corresponding to one service via the SMT. At this time, this field may be defined using 1 bit or 2 bits.

For example, if only 1 bit is used in this field, presence/absence of a service corresponding to a currently signaled service is indicated. If two bits are used in this field, presence/absence of services corresponding to a currently signaled service and a previously signaled service or a subsequently signaled service may be indicated. The corresponding service may be a 3D service if the signaled service is 2D and may be a 2D service if the signaled service is 3D.

If the value of the 2D_or_3D_serivce_exist_flag field (using 1 bit) is 0, this indicates that the corresponding 3D service (or 2D) is not present and, if the value of the 2D_or_3D_serivce_exist_flag field is 1, this indicates that the corresponding 3D service (or 2D) is present. If the value of the 2D_or_3D_serivce_exist_flag field is 1, the NRT_service_id value of the corresponding 3D NRT service (or 2D) may be obtained via the 2D_3D_corresponding_service_descriptor located at the below-described NRT service level, which will be described below.

If the value of the 2D_or_3D_serivce_exist_flag field (using 2 bits) is 00, this indicates that a 3D service (or 2D) corresponding to a currently signaled service is not present and, if the value of the 2D_or_3D_serivce_exist_flag field is 01, this indicates that a 3D service (or 2D) corresponding to a currently signaled service is present. If the value of the 2D_or_3D_serivce_exist_flag field is 10, this indicates that a 3D service (or 2D) corresponding to a service signaled at a different time is not present, and, if the value of the 2D_or_3D_serivce_exist_flag field is 11, this indicates that a 3D service (or 2D) corresponding to a service signaled at a different time is present. If the value of the 2D_or_3D_serivce_exist_flag field is 01 or 11, the NRT_service_id value of the corresponding 3D NRT service (or 2D) may be obtained via the 2D_3D_corresponding_service_descriptor located at the below-described NRT service level, which will be described below. Three or more bits may be allocated to this field to define presence/absence of services corresponding to services signaled at different times as previously and subsequently signaled services. This field may be defined in the form of the descriptor of each level of the SMT.

For example, if it is checked that an service A is 2D through a service_category field in the NRT_service_descriptor of the service A and the value of the 2D_or_3D_corresponding_service_exist_flag field of this service is 1, a receiving device may check that a 3D NRT service corresponding to the service A is present. The broadcast receiver may be aware of the service_id value of the 3D NRT service through 2D_3D_corresponding_service_descriptor.

In association with the present invention, the SMT further includes component level information, service level information, and subnet level information in addition to the information about each NRT service. The level information is defined in the form of a descriptor in the SMT section.

First, a method of signaling whether a service is a 2D NRT service or a 3D NRT service according to the present invention will be described. At this time, in the present specification, the component level information in the SMT may be used for signaling. Hereinafter, component_descriptor according to the present invention will be described.

Component_Descriptor

FIG. 7 is a diagram illustrating an example of the bitstream syntax of NRT_component_data_descriptor according to the present invention.

In association with the present invention, if the value of the component_type field of component_descriptor field in the SMT is 38, this indicates a normal NRT service. In association with this, in the present specification, if the value of the component_type field is 55, a 3D NRT service is defined and 3D format associated information may be further included as shown in FIG. 7. If necessary, if the value of the component-type field is 55, information shown in FIGS. 10 to 16 may be further included and a separately defined descriptor may be referred to using link information in this descriptor. Accordingly, the receiving device may determine whether a 3D video component is included in an NRT service only using the value of the component_type field of component_descriptor. In the present specification, if the value of the component_type field is newly defined, it may be determined whether a 3D NRT service is present at the component level and the broadcast receiver may cope with the presence/absence of the 3D NRT service in advance. A legacy broadcast receiver identifies and filters an NRT service to maintain compatibility, if the value of the component_type field is at least one of 38 and 55.

In the present invention, by defining one or more component_type values in association with an NRT service, if the component_type value is 55, a broadcast receiver without a component for processing 3D content may identify and filter a 3D NRT video component. That is, in the present invention, as described above, the component_type value is differently defined such that the receiving device performs adaptive processing.

In the examples of the broadcast receiver shown in FIGS. 2 and 3, the 3D formatter 250 may receive an image signal decoded by the A/V decoder and reformat a video signal (remap pixels) according to pixel arrangement of a 3D display. At this time, 3D associated information shown in FIG. 7 may be used as the 3D format information of video.

Hereinafter, the fields of the descriptor shown in FIG. 7 will be described in detail.

A single NRT service may contain multiple FLUTE sessions. Each session may be signaled using one or more FLUTE component descriptors, depending on the IP addresses and ports used for the sessions.

A 3D_structure field indicates a 3D video format of this video component. For example, SbS (Side-by-Side) or TaB (Top-and-Bottom) may be indicated according to the value of the 3D_structure field. In the present invention, in addition to SbS and TaB as the 3D video format, all available 3D video formats equal to those defined in the 3D_structure field of FIG. 11 may be defined and signaled.

An LR_first field indicates if first half (top half in Top-and-Bottom format and left half in Side-by-Side) is a left or right picture. The value 0 indicates that the first half of the video is left while the value 1 indicates that it is right.

A 3D_orientation field is defined in the following table 1.

TABLE 1

| 3D_orientation | Meaning |
| --- | --- |
| 00 | Left-, Right- |
| 01 | Left, Right Inverted |
| 10 | Left Inverted, Right- |
| 11 | Left Inverted, Right Inverted |

Referring to Table 1, the 3D_orientation field having a value of 00 indicates that the 3D_orientation of video is normal in which both the left picture and the right picture are not inverted, the 3D_orientation field having a value of 01 indicates that only the right picture is inverted in the 3D_orientation of video, the 3D_orientation field having a value of 10 indicates that only the left picture is inverted in the 3D_orientation of video, and the 3D_orientation field having a value of 11 indicates that both the left picture and the right picture are inverted in the 3D orientation of video.

A TSI field shall be the transport session identifier (TSI) of the FLUTE session.

A session_start_time field indicates the time at which the FLUTE session starts. If the value of this field is set to all zero, then it shall be interpreted to mean that the session has already started.

A session_end_time fields indicates the time at which the FLUTE session ends. If the value of this field is set to all zero, then it shall be interpreted to mean that the session continues indefinitely.

A tias_bandwidth_indicato field is a field that flags the inclusion of transport independent application specific (TIAS) bandwidth information. This bit shall be set to 1 to indicate that the TIAS bandwidth field is present, and it shall be set to 0 to indicate that the TIAS bandwidth field is absent.

An as_bandwidth_indicator field is a field that flags the inclusion of Application Specific (AS) bandwidth information. This bit shall be set to 1 to indicate that the AS bandwidth field is present, and it shall be set to 0 to indicate that the AS bandwidth field is absent.

A FEC_OTI_indicator field is an indicator that indicates whether FEC Object Transmission Information (OTI) is provided.

A tias_bandwidth field indicates a TIAS maximum bandwidth and the value thereof shall be one one-thousandth of the TIAS maximum bandwidth.

An as_bandwidth field shall be AS maximum bandwidth.

A FEC_encoding_id field indicates a FEC encoding ID used in this FLUTE session.

A FEC_instance_id field indicates a FEC instance ID used in this FLUTE session.

The above-described parameters may be signaled via FLUTE component data bytes to provide information necessary to receive the FLUTE session and a method of receiving an FDT via this session, acquiring information about all files delivered via the FLUTE session, and receiving these files may be used.

A FLUTE component descriptor may be delivered via the component_level_descriptor loop of the SMT. If there is a plurality of FLUTE channels, since TSI, session_start_time, session_end_time, etc. which are the session level parameters should be signaled only once. Thus, the FLUTE component descriptor may be transmitted via the component_level_descriptor loop only in one component among the components of several channels.

According to the present invention, it is determined whether the NRT service is 3D at the component level via NRT_component_data_descriptor of FIG. 7.

Capabilities Descriptor

Next, the 3D NRT service may be identified using capability_descriptor. Accordingly, if capability_descriptor according to the present invention is used, it is possible to determine whether the service is a 3D NRT service at a service level. Capability_descriptor is also defined by a content level descriptor of the below-described NRT-IT. In the present specification, capability_descriptor at the content level of the NRT-IT is not separately described and will be described herein.

The broadcast receiver may determine whether the service or the content item is 3D using information of capability_descriptor and determine whether the service or the content is downloaded depending on whether the broadcast receiver supports 3D (3D display or 3D format).

FIG. 8 is a diagram illustrating an example of the bitstream syntax of capability_descriptor according to the present invention.

Hereinafter, the fields of capability_descriptor will be described.

A descriptor_tag field is a predefined value and identifies this descriptor. A descriptor_length field indicates the total length of this descriptor.

A capability_code_count field shall indicate the number of capability_code blocks. The following fields may be defined using the loop structure of each block according to the number of blocks defined in the capability_code_count field.

An essential_indicator field indicates whether support for the capability represented by the capability code following this field is essential to meaningful presentation of the service or content item, or not. The value 1 shall indicate that the capability is essential. The value 0 shall indicate that it is not essential.

A capability_code shall represent a specific capability as defined in Table 2.

TABLE 2

| Capability_code value | Meaning |
| --- | --- |
| 0x00 | Forbidden |
| | Download Protocols |
| 0x01 | FLUTE protocol, as specified in this Standard. |
| 0x02-0x0F | Reserved for future ATSC use. |
| | FEC Algorithms |
| 0x10 | Compact No-Code FEC scheme |
| 0x11 | Raptor algorithm, as specified in this Standard. |
| 0x12-0x1F | Reserved for future ATSC use. |
| | Wrapper/Archive Formats |
| 0x20 | MP4 multimedia container format. |
| 0x21 | ZIP format, as specified in this Standard. |
| 0x22-0x2F | Reserved for future ATSC use. |
| | Compression Algorithms |
| 0x30 | DEFLATE algorithm, as specified in this Standard. |
| 0x31-0x3F | Reserved for future ATSC use. |
| | Media Types |
| 0x41 | AVC video per A/72 up to level 4.0 (level_idc <= 40). |
| 0x42 | AVC video per A/72 up to level 4.2 (level_idc <= 42). |
| 0x43 | AC-3 audio per A/53 Part 5 [4]. |

TABLE 2-continued

| Capability_code value | Meaning |
| --- | --- |
| 0x44 | E-AC-3 audio per A/52 (also see Section A.2.5.1 and A.2.5.2). |
| 0x45 | MP3 audio per ISO/IEC 13818-3 [49]. |
| 0x46 | Browser Profile A |
| 0x47 | Reserved |
| 0x48 | Atom per RFC 4287 [36]. |
| 0x49 | AVC video per A/153 Part 7 [9]. |
| 0x4A | HE AAC per A/153 Part 8 [10]. |
| 0x4B | Reserved for future ATSC use. |
| 0x4C | DTS-HD Audio. |
| 0x4D | 3D video coded through AVC |
| 0x4E | 3D video coded through AVC (SbS) |
| 0x4F | 3D video coded through AVC (TaB) |
| 0x50-0x6F | Reserved for future ATSC use. |
| 0x70-0x7F | Available for private use. |

Referring to Table 2, the capability_code value defines the meanings of download protocols, FEC algorithms, wrapper/archive formats, compression algorithms and media types.

For the values and meanings of download protocols, FEC algorithms, wrapper/archive formats and compression algorithms, refer to known content. Hereinafter, only the media type will be described in association with the present invention.

The capability_code values for media types may be roughly defined as 0x41 to 0x4F. Here, in order to identify a 3D service or 3D content according to the present invention, a capability_code value of 0x4D indicates 3D video coded through advanced video coding (AVC), a capability_code value of 0x4E indicates 3D video coded through AVC, the video format of which is SbS, and a capability_code value of 0x4F indicates 3D video coded through AVC, the video format of which is TaB. If the capability_code value is 0x4D, the detailed video format information may be represented using a separate descriptor. For example, refer to FIGS. 11 to 16.

A format_identifier field is a value defined if the capability_code value is greater than 0x6F and only identifies only the private information contained within this descriptor. (This field use in this descriptor shall scope and identify only the private information contained within this descriptor).

A capability_string_count field shall indicate the number of capability_string blocks to follow. The following fields may be defined using the loop structure of each block according to the number of blocks defined in the capability_string_count field.

An essential_indicator indicates whether support for the capability represented by the capability code following this field is essential to meaningful presentation of the service or content item, or not. The value 1 shall indicate that the capability is essential. The value 0 shall indicate that it is not essential.

A capability_category_code field shall indicate the capability category for the following string value.

A capability_string_length field shall specify the length (in bytes) of the capability_string( ).

A capability_string( ) field defines a string containing the representation of a capability.

NRT Service Descriptor

FIG. 9 is a diagram illustrating an example of the bitstream syntax of NRT_service_descriptor according to the present invention.

A descriptor_tag field is a predefined value and identifies this descriptor. A descriptor_length field indicates the total length of this descriptor.

An NRT_service_category field indicates a service category according to the present invention. The value 0x01 of this field indicates that a normal NRT service is browse & download, the value 0x02 indicates that the normal NRT service is portal, and the value 0x03 indicates that the normal NRT service is Push. According to the present invention, the value 0x04 of this field indicates that a 3D NRT service is browse & download and the value 0x05 indicates that the 3D NRT service is Push.

NRT_service_descriptor is located at the service level of the SMT and may be signaled by defining the value of the NRT_service_category field if the NRT service is a 3D NRT service according to the present invention. Accordingly, the receiving device may determine that the service is a 3D NRT service at the service level, if the NRT_service_category field in the NRT_service_descriptor is 0x04 or 0x05.

The below-described 3D_NRT_descriptor may be added to the NRT service level.

3D NRT Descriptor

FIG. 10 is a diagram illustrating an example of the bitstream syntax of 3D_NRT_descriptor according to the present invention.

3D_NRT_descriptor includes detailed information on 3D content.

A descriptor_tag field is a predefined value and identifies this descriptor. A descriptor_length field indicates the total length of this descriptor.

A 3D_structure field describes the video format of 3D content. The value and meaning of this field may be defined, for example, as shown in FIG. 11.

Referring to FIG. 11, a 3D_structure field value 0000 indicates full resolution Left & Right, a 3D_structure field value 0001 indicates field alternative, a 3D_structure field value 0010 indicates line alternative, a 3D_structure field value 0100 indicates left Image plus depth (L+depth), a 3D_structure field value 0110 indicates TaB, a 3D_structure field value 0111 indicates frame sequential, and a 3D_structure field 1000 indicates SbS. The values and meanings of the fields shown in FIG. 5-1 are merely exemplary and the present invention is not limited thereto.

If a 3D_metadata_exist_flag field is 1, a 3D_metadata_type field, a 3D_metadata_length field, a 3D_metadata field, etc. may be further included in the 3D_NRT_descriptor.

A 3D_sampling field indicates information about a frame-compatible format of 3D content. The value and meaning of this field may be defined, for example, as shown in FIG. 12. This field will be described with reference to FIGS. 13 and 14. FIGS. 13(a) and 14(a) show odd positions and FIGS. 13(b) and 14(b) show even positions.

Referring to FIGS. 12 and 13, for example, a 3D_sampling field value 0000-0011 indicates sub-sampling. More specifically, a 3D_sampling field value 0000 indicates sub-sampling, more particularly, odd left and odd right, a 3D_sampling field value 0001 indicates sub-sampling, more particularly, odd left and even right, a 3D_sampling field value 0010 indicates sub-sampling, more particularly, even left and odd right, and a 3D_sampling field value 0011 indicates sub-sampling, more particularly, even left and even right. Referring to FIGS. 12 and 14, a 3D_sampling field value 0100-0111 indicates a quincunx matrix. For example, a 3D_sampling field value 0100 indicates a quincunx matrix, more particularly, odd left and odd right, a 3D_sampling field value 0101 indicates a quincunx matrix, more particularly, odd left and even right, a 3D_sampling field value 0110 indicates a quincunx matrix, more particularly, even left and odd right, and a 3D_sampling field value 0111 indicates a quincunx matrix, more particularly, even left and even right. Although the 3D video format is SbS in the above description, TaB may be defined in the same manner and may be further defined in addition to the above example.

A 3D_orientation field indicates a pixel arrangement form of left and right view image data in 3D content. The value and meaning of this field may be defined, for example, as shown in FIG. 15.

For example, a 3D_orientation field value 00 indicates that both left view image data and right view image data are normal, a 3D_orientation field value 01 indicates that left view image data is normal but right view image data is inverted, a 3D_orientation field value 10 indicates that right view image data is normal but left view image data is inverted, and a 3D_orientation field value 11 indicates that both left view image data and right view image data are inverted.

A 3D_metadata_type field is valid only when the value of the 3D_metadata_exist_flag field is 1 and 3D_metadata_length and 3D_metadata may be defined using this field, for example, as shown in FIG. 16.

If the value of the 3D_metadata_type field is 000, 3D_metadata_length is 4 and 3D_metadata may have all or at least one of four values. In the four values, 3D_metatdat [0] means parallax_zero, 3D_metatdat[1] means parallax_scale, 3D_metatdat[2] means Dref, and 3D_metatdat[3] means Wref. In contrast, if the value of the 3D_metadata_type field is 001, 3D_metadata_length is also 4 and 3D_metadata may have all or at least one of four values. In the four values, 3D_metatdat[0] means xB, 3D_metatdat[1] means Zref, 3D_metatdat[2] means Dref, and 3D_metatdat [3] means Wref.

The parameter of FIG. 16 are environmental values intended in a process of producing 3D content and are used to obtain the 3D effect intended by a producer. Each parameter is a data for accurately interpreting each parallax if a parallax map is transmitted together with a depth map. In other words, if a parallax map is received, an image for a new viewing point is produced by applying parallax values transformed in consideration of a reference value of each value and a current viewing environment.

A parameter $D_{ref}$ is a distance between a viewer and a screen defined as a reference in a process of producing 3D content (unit: cm). A parameter $W_{ref}$ is the width of a screen defined as a reference in a process of producing 3D content (unit: cm). A parameter $Z_{ref}$ is the depth defined as a reference in a process of producing 3D content (unit: cm). A parameter $X_B$ is a distance (reference value is 65 mm) between viewer's eyes defined as a reference.

Reference parallax $P_{ref}$ is calculated using Equation 1 (it is assumed that the value of the parallax map is expressed by N bits).

$$P{ref}=((m \text{ parallax\_zero})/2^N)*(\text{parallax\_scale}/256)*(W{ref}/8) \quad \text{Equation 1}$$

Parallax on an actual screen is calculated as shown in Equation 2 (for Equation derivation, see ISO23002-3).

$$p = \chi_B \left(1 - \frac{D}{D - \left(\frac{D_{ref}}{W_{ref}} * \frac{W \cdot P_{ref}}{P_{ref} - \chi_B}\right)}\right) \quad \text{Equation 2}$$

$$\approx -p_{ref} * \frac{dref}{wref} * \frac{W}{D} * \frac{\chi_B}{P_{ref} - \chi_B}$$

In Equation 2, D and W denote the distance between the receiving device and the viewer and the width of the screen, respectively. If 3D_metadata_type is 000, the parameter $X_B$ is not transmitted and, at this time, calculation is performed on the assumption that the parameter $X_B$ is 65 mm.

2D_3D_Corresponding_Service_Descriptor

FIG. 17 is a diagram illustrating an example of the bitstream syntax of the 2D_3D_corresponding_service_descriptor according to the present invention.

2D_3D_corresponding_service_descriptor is located at a service level of the SMT and indicates 3D service information corresponding to a 2D service or 2D service information corresponding to a 3D service.

Hereinafter, the fields of this descriptor will be described.

A descriptor_tag field is a predefined value and identifies this descriptor. A descriptor_length field indicates the total length of this descriptor.

A corresponding_NRT_service_id field indicates the identifier (id) of a 3D service corresponding to a 2D service of this descriptor and the identifier (id) of a 2D service corresponding to a 3D service.

If a service A is a 2D browse & download service, it is assumed that service_category has a value of 0x01 and service_id is 0x0020. At this time, when a service B is a 3D version of the service A, it is assumed that service_category of the service B is 0x04 and service_id is 0x0030.

When the service A is signaled in the SMT, 2D_or_3D_service_exist_flag is set to 1 and 2D_3D_corresponding_service_descriptor is included at the service level. At this time, corresponding_NRT_service_id has a value of 0x0030 (service_id of the service B).

When the service B is signaled in the SMT, 2D_or_3D_service_exist_flag is set to 1 and 2D_3D_corresponding_service_descriptor may be included or omitted at the service level.

In contrast, 2D_3D_corresponding_service_descriptor may be included with respect to the service B and 2D_3D_corresponding_service_descriptor may be omitted with respect to the service A (2D_3D_corresponding_service_descriptor is included only in one service and, at this time, 2D_or_3D_service_exist_flag of both services is set to 1).

As the method of configuring the SMT, for example, one or more NRT channels may be configured as one channel.

In the present specification, an NRT channel is configured in NRT service units and one or more FLUTE sessions for transmitting a file using FLUTE may be included.

In general, a FLUTE session may be uniquely identified/referenced using parameters such as TSI, IP and port address and are temporally bounded to session_start_time and session_end_time.

When configuring a table, a FLUTE session during this time is announced using session_start_time and session_end_time.

Information about currently transmitted NRT channels and NRT channels to be transmitted in the future may configure one table. The table may be configured to be divided into the present (within a predetermined period from the present) and the future (after the predetermined period from the present) or a period within a predetermined time from the present (e.g., 24 hours), a period within a predetermined time therefrom (e.g., 24 hours), and a subsequent period thereof.

A determination as to whether there is guide information of a currently received content or guide information of content to be received in the future may be made using table_id. This is a method of dividing NRT services received within a short range and NRT services received after the range into different tables and transmitting the NRT services.

If guide information of content to be received in the future is received, the receiving device performs temporal alignment using available_start_time and available_end_time information of content and outputs guide information of an NRT service to a user.

Although the method of configuring the table is changed, the fields configuring the table element may be the same.

NRT-IT (NRT_Information Table)

Hereinafter, NRT content transmitted via each NRT content delivery channel signaled via the above-described SMT will be described with respect to the NRT-IT associated with signaling/announcement. The NRT-IT contains information describing content items available for download to storage in the receiving device. The information provided in the NRT-IT includes the title of the content item (for example, the name of the program available for download), the times during which the content item is to be made available for download, and information such as content advisories, availability of closed captioning, content identification, and other metadata.

FIG. 18 is a diagram illustrating an example of the bitstream syntax of NRT-IT according to an embodiment of the present invention.

In FIG. 18, the NRT-IT is newly defined in order to signal NRT content. This is merely exemplary and another method may be used. The NRT content transmitted via a specific NRT content delivery channel may be signaled via the NRT-IT.

Hereinafter, information of the fields configuring an NRT-IT section will be described in greater detail.

A table_id field shall be set to 0xDF to identify this table section as belonging to the NRT-IT.

A service_id field shall specify the service_id associated with the NRT service offering the content items described in this section.

A subnet_id field shall indicate the IP subnet associated with this SSC.

An NRT-IT_version_number field shall indicate the version number of this NRT-IT instance, where an NRT-IT instance is defined as the set of one or more NRT_information_table_section( ) having common values for service_id, current_next_indicator, protocol_version, and time_span_start. The version number shall be incremented by 1 modulo 32 when any field in the NRT-IT instance changes. Accordingly, the receiving device may confirm whether the NRT-IT is changed by referring to this field and thus update, ignore or discard the NRT-IT.

A current_next_indicator field shall always be set to 1 for NRT-IT sections; the NRT-IT sent is always currently applicable.

A section_number shall give the section number of this NRT-IT Table Instance section.

A last_section_number shall give the number of the last section (i.e., the section with the highest section_number) of the NRT-IT Table Instance of which this section is a part).

A num_contents_in_section field indicates the number of contents described in the NRT-IT.

A content_version field indicates the version number of content (or file) having a specific content-id value. That is, if content_id of the file which was received by and stored in the receiving device is 0x0010, the same content, that is, a file having a content_id value of 0x0010, is transmitted and, if content_version is different from the previously received and stored content, content which is newly announced via the NRT-IT is received to update or replace the previously stored content. In the present embodiment, this means a serial number indicating the release version, but may represent a published (released) time. At this time, if it is difficult to represent the published time using the content_version field, a new field for representing the published (released) time may be used.

A content_id field uniquely identifies content (or a file).

A content_available_start_time field and a content_available_end_time field indicate the start time and end time of a FLUTE session for receiving content, respectively.

A content_length_in_seconds field indicates an actual playback time of content in seconds if content (or a file) is an A/V) file.

A content_size field indicates the size of content (or file) in bytes.

A content_delivery_bit_rate field indicates a delivery bit rate of content (or file) and means a target bit rate. That is, this field represents the size of bandwidth allocated when a service provider or a broadcast station transmits content. Using this information, the receiving device may confirm a minimum time required to receive the file using content_size and content_delivery_bit_rate. That is, the time required to receive content may be estimated and provided to the user and the minimum time required to receive the content is obtained by (content_size*/8)/(content_delivery_bit_rate) in seconds.

A content_title_length field indicates the length of content-title_text( ) in bytes. Using this field, the receiving device can check how many bytes of data are read in order to accurately acquire content_title_text( ) information.

A content_title_tex( ) field indicates the title of the content in the format of a multiple string structure (MSS).

A time_span_start field shall represent the start of the time span covered by this instance of the NRT-IT, expressed as the number of GPS seconds since 00:00:00 UTC, 6 Jan. 1980. The time of day of time_span_start shall be aligned to minute 00 of the hour. The value zero for time_span_start shall indicate the time period covered by his NRT-IT instance began in the indefinite past. The value of time_span_start shall be the same for each section of a multi-sectioned NRT-IT instance. The values of time_span_start and time_span_length shall be set such that the specified time span does not overlap with any other NRT-IT instance in this IP subnet.

A time_span_length field shall indicate the number of minutes, starting at the time indicated by time_span_start, covered by this instance of the NRT-IT.

A num_content_items_in_section field shall indicate the number of content items described in this NRT-IT section. The fields following this field are defined with respect to content items using the loop structure.

A content_linkage field shall specify the identification number of the content item described. The content_linkage performs two linkage functions: it links metadata in the NRT-IT to one or more files in the FLUTE FDT associated with this NRT content item; it also forms the TF_id (identifier for Text Fragment in Text Fragment Table). Each file associated with the content item shall have a FLUTE FDT content linkage tag matching the value of this content_linkage field. For a particular NRT service, the value of content_linkage shall be unique over the set of linkage values for all content items and icons in the service from the time when the content item or icon descriptor first appears in the NRT-IT or any of its files appear in FLUTE FDT instances to the time when the content item or icon descriptor no longer appears in the NRT-IT and none of its files appear in FLUTE FDT instances.

An updates_available field shall specify, when set to 1, that the referenced content item(s) will be updated periodically: for content items delivered in FLUTE sessions, receiving devices are expected to monitor changes in the TOI associated with each file associated with the given value of content_linkage. When the updates_available flag is set to 0, updates are not expected to be provided for the associated content item(s), and the receivers are not expected to look for the same.

A TF_available field shall specify, when set to 1, that a Text Fragment is present in a Text Fragment Table in the SSC. When the flag is set to 0, no Text Fragment is included in the service signaling channel for this content item.

A content_security_conditions_indicator field shall indicate, when set to 1, that content protection is applied to at least one of the files that constitute this content item.

An available_on_internet field shall indicate, when this field is set to 1, that all the files that constitute this content item are available over the Interaction Channel, and that the Content-Location attribute in the FLUTE FDT for each file belonging to this content item is the URL of that file 8. When this field is set to 0, it shall convey no information about whether or not the files that constitute this content item are available over the Interaction Channel.

A playback_length_included field shall indicate, when set to 1, that the playback_length_in_seconds field is present in this iteration of the for loop. Setting this flag to 0 shall indicate the playback_length_in_seconds field is not present in this iteration of the for loop.

A playback_delay_included field shall indicate, when set to 1, that the playback_delay field is present in this iteration of the for loop. Setting this flag to 0 shall indicate the playback_delay field is not present in this iteration of the for loop.

An expiration_included field shall indicate, when set to 1, that the expiration field is present in this iteration of the for loop. Setting this flag to 0 shall indicate that the expiration field is not present in this iteration of the for loop.

A content_length_included field shall indicate, when set to 1, that the content_length field is present in this iteration of the for loop. Setting this flag to 0 shall indicate the content_length field is not present in this iteration of the for loop.

An acquisition_time field shall specify the expected cycle time, in minutes, of the carousel containing the referenced content item. A receiver is expected to use the acquisition_time parameter to determine the amount of time needed to capture the referenced content.

A playback_length_in_seconds field shall specify the duration of playback of the content, in seconds. For content that includes audio or audio/video content, the playback_length_in_seconds shall indicate the playback length of the audio or audio/video content.

A playback_delay field is count of the number of seconds following reception of the first byte of the associated content. The receiver shall wait before playback may start, while buffering the incoming stream. A value of zero shall indicate that playback may commence immediately.

An expiration field shall represent the expiration time of the content, expressed as the number of GPS seconds since 00:00:00 UTC, 6 Jan. 1980. Following expiration, the content should be deleted from memory. If an expiration time is not specified, receivers are expected to use methods of their own choosing to manage memory resources.

A content_length field shall represent, when present, the total size in bytes of the content item or items. This item is used by the receiving device to determine if enough memory is available to store the same before downloading is attempted.

A content_name_length field shall specify the length (in bytes) of the content_name_text( ).

A content_name_text( ) field shall specify the content item title in the format of a multiple string structure.

A num_content_descriptors_length field shall indicate the total number of descriptors in the descriptor list that follows.

A content_descriptor( ) field may appear in the content item level descriptor to provide information about individual content items (one or more descriptors in standard MPEG-2 descriptor format (tag, length, data) may appear in this content item level descriptor loop to provide information about individual content items).

A num_descriptors field indicates the number of descriptors (if any) to follow.

A descriptor( ) field may appear in this NRT-IT level descriptor loop to provide information common to all the NRT content described in this section and may include one or more descriptors (zero or more descriptors in standard MPEG-2 descriptor format (tag, length, data) may appear in this NRT-IT level descriptor loop to provide information common to all the NRT content described in this NRT_information_table_section( )).

The NRT-IT section according to the present invention may include a field indicating whether content corresponding to specific content is present similarly to the above-described SMT according to the present invention.

A 2D_or_3D_content_exist_flag field indicates that there is 3D content corresponding to 2D content which is currently announced via the NRT-IT or 2D content corresponding to 3D content which is currently announced. If this field is 0, this indicates that 3D content (or 2D content) is not present and, if this field is 1, a content_linkage value for corresponding 3D NRT content (or 2D NRT content) is found via the 2D_3D_corresponding_content_descriptor located at the NRT content level.

Media_Type_Descriptor

FIG. 19 is a diagram illustrating an example of the bitstream syntax of a media_type descriptor according to the present invention.

A descriptor_tag field is a predefined value and identifies this descriptor. A descriptor_length field indicates the total length of this descriptor.

An application_type field indicates the type of an application associated with NRT content.

A media_type_length field indicates the length of the media_type field to follow.

A media_type field indicates the media type associated with the NRT content.

According to the present invention, if content announced via the NRT-IT is 3D content, the application_type field included in the media_type_descriptor of the content has a value of 0x02. At this time, if the value of the application_type field is 0x01, a normal NRT service is indicated.

Accordingly, the receiver can determine whether the content is 3D content via the application_type of the content announced via the NRT-IT. With respect to 3D content, 3D_NRT_descriptor shown in FIG. 10 may be added to the content level of the NRT-IT.

2D_3D_Corresponding_Content_Descriptor

FIG. 20 is a diagram illustrating an example of the bitstream syntax of a 2D_3D_corresponding_content_descriptor according to the present invention.

FIG. 20 corresponds to FIG. 17, in which information for linkage with NRT content in the NRT-IT is included.

According to the present invention, the 2D_3D_corresponding_content_descriptor is located at a content level of the NRT-IT and indicates 3D content information corresponding to 2D content or 2D content information corresponding to 3D content.

A descriptor_tag field is a predefined value and identifies this descriptor. A descriptor_length field indicates the total length of this descriptor.

A corresponding_content_linkage field indicates id (content_linkage) information corresponding to content of this descriptor.

If the content is 2D content, id (content_linkage) of corresponding 3D content is indicated and, if the content is 3D content, id (content_linkage) of corresponding 2D content is indicated.

For example, assume that content A is 2D content, the value of the application_type field is 0x01, and the value of the content_linkage field is 0x00001000. In this case, assume that content B is a 3D version of the content A, the value of the application_type field is 0x02 and the value of the content_linkage field is 0x00002000.

When the content A is announced in the NRT-IT, the 2D_or_3D_content_exist_flag is set to 1 and includes the 2D_3D_corresponding_content_descriptor at the content level. At this time, the corresponding_content_linkage field in the 2D_3D_corresponding_content_descriptor has a value of 0x00002000 which is the value of the content_linkage field of the content B which is the 3D version of the content A.

When the content B is announced in the NRT-IT, the 2D_or_3D_content_exist_flag is set to 1 and may include or omit the 2D_3D_corresponding_content_descriptor at the content level. In contrast, the 2D_3D_corre- sponding_content_descriptor may be included with respect to the content B and the 2D_3D_corresponding_content_descriptor may be omitted with respect to the content A.

The 2D_3D_corresponding_content_descriptor may be included in only one piece of content and, at this time, 2D_or_3D_service_exist_flag in the 2D_3D_corresponding_content_descriptor of both pieces of content is set to 1, thereby preventing confusion.

Hereinafter, an example of operation of a receiving device according to the present invention will be described.

In particular, the receiving device may provide a service list for a currently received NRT service according to the present invention. Hereinafter, a method of providing the service list will be described.

The receiving device first parses the SMT. At this time, in order to parse the SMT, the receiving device obtain the SMT at an IP level via a PSI/PSIP and, more particularly, a virtual channel map (VCT), the detailed description of which will be omitted.

A determination as to whether a service is a 2D or 3D service is made using an NRT_service_category field of each service.

A determination as to whether a 2D/3D service corresponding to the service is present is made using a 2D_or_3D_service_exist_flag field of each service. If the corresponding 2D/3D service is present, a corresponding service pair is checked using a corresponding_service_id field. The service pair may be displayed on the same screen as the service list as shown in FIG. 21.

In this case, the receiving device may download a service pair with respect to one NRT service according to user setting or automatically. In the case in which the receiving device also downloads the service pair, if a user presses a 2D/3D switch button in a process of playing back NRT content stored by the user, the content is played back to provide user convenience.

Hereinafter, another example of operation of the receiving device according to the present invention will be described.

In particular, the receiving device may provide a content list for currently received NRT content according to the present invention. Hereinafter, a method of providing the content list will be described.

The receiving device first parses the NRT-IT. At this time, in order to parse the NRT-IT, the receiving device obtains the NRT-IT at the IP level via a PSI/PSIP and, more particularly, a VCT, the detailed description of which will be omitted.

A determination as to whether content is 2D or 3D content is made using an application_type field of content.

A determination as to whether 2D/3D content corresponding to the content is present is made using a 2D_or_3D_content_exist_flag field of each service.

If the corresponding 2D/3D content is present, a corresponding content pair is checked using a corresponding_content_linkage field. The content pair may be displayed on the same screen as the content list as shown in FIG. 22.

The service_id of the NRT content pair is checked. The checked service_id may be a corresponding service id when the content is actually received.

The receiving device may schedule download to receive the NRT content pair according to user choice or automatically. In this case, when the content is broadcast, the service_id corresponding to the schedule-downloaded content is found, received and stored. The receiver may use the service_id value of content from the parsed NRT-IT. Accordingly, when the user plays the stored content back, if a 2D/3D switch button is pressed, the content is switched and played back, thereby providing user convenience.

Content_Labeling_Descriptor & ATSC Content Identifier

FIG. 23 is a diagram illustrating an example of the bitstream syntax of a content_labeling_descriptor according to the present invention.

The content_labeling_descriptor according to the present invention is located at the content level of the NRT-IT and uniquely defines content using content_reference_id. In a representative case, it may be determined whether currently broadcast NRT or NRT content to be broadcast in the future is already stored in the receiving device using the content_reference_id field.

Hereinafter, the fields of this descriptor will be described.

A descriptor_tag field is a predefined value and identifies this descriptor. A descriptor_length field indicates the total length of this descriptor.

A metadata_application_format field specifies the application responsible for defining usage, syntax and semantics of the content_reference_id record and of any other privately defined fields in this descriptor. The value 0xFFFF indicates that the format is signaled by the value carried in the metadata_application_format_identifier field.

Coding of a metadata_application_format_identifier field is fully equivalent to coding of the format_identifier field in the registration_descriptor.

A content_reference_id_record_flag field signals the presence of a content_reference_id_record in this descriptor.

A content_time_base_indicator field specifies the used content time base. If the descriptor is associated with a program, then the content time base applies to all streams that are part of that program. A value of 1 indicates usage of the STC, while a value of 2 indicates usage of a Normal Play Time (NPT) as defined in ISO/IEC 13818-6. The values between 8 and 15 indicate usage of a privately defined content time base.

A content_reference_id_record_length field specifies the number of content_reference_id_bytes immediately following this field).

A content_reference_id_byte field is part of a string of one or more contiguous bytes that assigns one or more reference identifications (labels) to the content to which this descriptor is associated. The format of this byte string is defined by the body indicated by the coded value in the metadata_application_format field.

A content_time_base_value field specifies a value in units of 90 kHz of the content time base indicated by the content_time_base_indicator field.

A metadata_time_base_value field is coded in units of 90 kHz. The field is coded with the value of the metadata time base when the base indicated by content_time_base_indicator reaches the value encoded in the content_time_base_value field.

A content_Id field specifies the value of the content_Id field in the NPT Reference Descriptor for the applied NPT time base.

A time_base_association_data_length field specifies the number of reserved bytes immediately following this field. The reserved bytes can be used to carry time base association data for time bases defined in future.

A private_data_byte field represents data, the format of which is defined privately. These bytes can be used to provide additional information as deemed appropriate. The use of these bytes is defined by the metadata application format.

According to the present invention, the value of the content_reference_id_byte field in this descriptor has the same value as the ATSC_content_identifier of FIG. 24.

FIG. 24 is a diagram illustrating an example of the bitstream syntax of an ATSC content identifier according to the present invention.

An ATSC_Content_Identifier is a structure that is composed of a TSID and a "house number" with a period of uniqueness. A "house number" is any number that the holder of the TSID wishes as constrained herein. Numbers are unique for each value of TSID.

Hereinafter, the fields of ATSC_Content_identifier will be described in detail.

A TSID field shall contain a value of transport_stream_id.

An end_of_day field shall be set to the hour of the day in UTC in which the broadcast day ends and the instant after which the content_id values may be re-used according to unique_for.

A unique_for field shall be set to the number of days, rounded up, measured relative to the hour indicated by end_of_day, during which the content_id value is not reassigned to different content.

A content_id field shall be set to the value of the identifier according to the house number system or systems for the value of TSID. Each such value shall not be assigned to different content within the period of uniqueness set by the values in the end_of_day and unique_for fields. The identifier may be any combination of human readable and/or binary values and need not exactly match the form of a house number, not to exceed 242 bytes.

According to the present invention, as described above, content_reference_id_byte of content_labeling-descriptor have the same value as the ATSC content identifier. The value of content_id may be configured as follows.

The content_id field included in ATSC_content_identifier is configured as follows.

<major_channel_number><minor_channel_number> <NRT_service_id><content_linkage><ISAN>

At this time, the ISAN follows the structure of ATSC A/57B and includes a root identifier, an episode identifier and a version identifier.

As another embodiment, the content_id field of the ATSC_content_identifier may be configured only using the ISAN. At this time, all or some of major_channel_number, minor_channel_number, NRT_service_id and content_linkage may be included in the root identifier.

FIG. 25 is a diagram illustrating an example of the bitstream syntax of the 2D_3D_corresponding_content_id_descriptor according to the present invention.

FIG. 25 is compared with the 2D_3D_corresponding_content_id_descriptor of FIG. 20. In particular, this descriptor may transmit service_id or content_linkage information of corresponding service/content using the 2D_3D_corresponding_service_id_descriptor or the 2D_3D_corresponding_content_id_descriptor if corresponding 2D content and 3D content is arranged in the same time slot.

However, the corresponding NRT content pair is arranged in completely different time slots, in order to indicate this information, a content_id system of the ATSC_content_identifier should be used. The receiving device stores content_id information (content_labeling_descriptor) of content to be downloaded via the NRT-IT.

If the 2D_3D_corresponding_content-id_descriptor is present in content the 2D_or_3D_content_exist_flag of which is 0, it is determined that the content is a 2D or 3D version of the previously broadcast content.

A descriptor_tag field is a predefined value and identifies this descriptor. A descriptor_length field indicates the total length of this descriptor. In addition, a corresponding_content_id field is similar to that of FIG. 20.

According to the present invention, the 2D_3D_corresponding_content_id_descriptor is located at the content level of the NRT-IT and provides corresponding content_id information.

The content_reference_id_byte has the same value as the ATSC_content_identifier by ATSC A/58B and is defined as shown in FIG. 24.

The content_id field included in ATSC_content_identifier is configured as follows.

<major_channel_number><minor_channel_number> <NRT_service_id><content_linkage><ISAN>

At this time, the ISAN follows the structure of ATSC A/57B and includes a root identifier, an episode identifier and a version identifier. As another embodiment, the content_id field of ATSC_content_identifier may be configured using only the ISAN. At this time, all or some of major_channel_number, minor_channel_number, NRT_service_id and content_linkage may be included in the root identifier.

Next, operation of the receiving device according to the present invention when the above-described information is used will be described.

The receiving device stores content_id information of content to be downloaded via the NRT-IT. In this case, the receiving device may use content_labeling_descriptor of a content level. For example, assume that 2D content A is stored.

The receiving device checks information about content B via the NRT-IT. At this time, if content B is 3D content, 2D_or_3D_content_exist_flag is 0 and the 2D_3D_corresponding_content_id_descriptor is present, it is determined that the content is a 3D version of the previously broadcast content.

Corresponding_content_id information of content B is compared with content_id of content previously stored in the receiver.

It is determined that the content_id information of content B matches content_id of the previously stored content A. This information is displayed on an EPG screen and the content B is scheduled to be downloaded according to user choice or automatically.

Figures 26, 27:
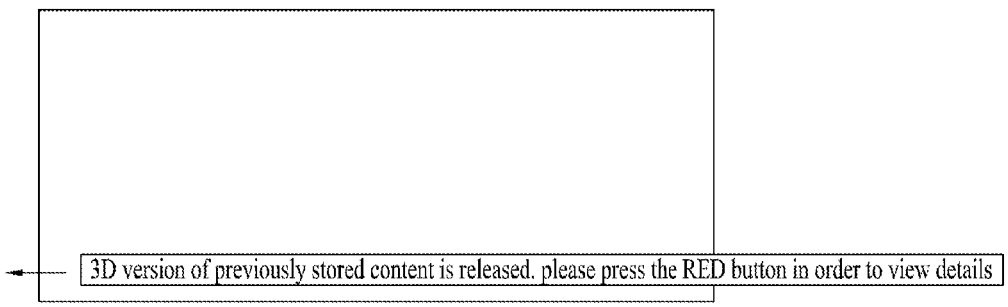
FIG. 26 is a diagram illustrating an example of a user interface (UI) indicating presence/absence of a 3D version according to the present invention.
FIG. 27 is a diagram showing another example of NRT-EPG according to the present invention.

FIG. 26 is a diagram illustrating an example of a user interface (UI) indicating presence/absence of a 3D version according to the present invention, FIG. 27 is a diagram showing another example of NRT-EPG according to the present invention, and FIG. 28 is a diagram showing a detailed example of the UI of FIG. 27.

Referring to FIG. 26, in the receiving device, a text bar may be scrolled in order to indicate that content, that is, a 3D version, corresponding to 2D content stored via the NRT-IT is present while viewing the broadcast screen based on signaling information of the receiver, as shown in FIG. 26. The present invention is not limited to FIG. 26 and a separate UI may be configured to select and set a control operation associated with presence/absence of the 3D version on an OSD (on-screen display) screen.

FIG. 27 shows the NRT-EPG screen obtained by parsing at least one of the SMT or the NRT-IT. For example, even when a user presses a specific button such as a red button, the same NRT-EPG may be provided. Referring to FIG. 27, in the NRT-EPG provided according to user request, an indicator indicating whether content is 2D or 3D content is provided. In particular, in association with the present invention, content corresponding to specific content is provided, for example, information indicating that the SBS provides NRT content "My wife is coming back Episode 22" of a 2D version at 12 o'clock and the SBS provides content "My wife is coming back Episode 22" of a 3D version at 15:30 is provided. In this case, the content of the 3D version is not limited to the content of the same episode and may be, for example, content of another episode (Episode 21, Episode 23, special episode, etc.). Although provision of information about content corresponding to specific content only via the same channel is described in FIG. 27, the present invention is not limited thereto and information about different channels may be provided and information about corresponding content of another medium may be provided.

FIG. 28 illustrates detailed information and processing associated therewith if a user selects 2D content "Wang-geon the Great, Episode 30" shown in FIG. 27. For example, in FIG. 28, information indicating that the selected content is the 3D version of the content "Wang-geon the Great, Episode 30", a schedule recording function, a back function, etc. are provided. In this case, although not shown, detailed information regarding the content, e.g., a variety of information such as synopsis information, episode information, broadcast start time information, broadcast end time information or thumbnail information may be provided using signaling information and announcement information obtained from the SMT or NRT-IT.

MODE FOR INVENTION

Various embodiments have been described in the best mode for carrying out the invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention relates to a non-real-time broadcast service and is applicable to broadcasting and communications.

The invention claimed is:

1. A method of processing a non-real-time (NRT) service in a broadcast receiver, the method comprising:
   receiving a broadcast service and signaling information; and
   processing the NRT service,
   wherein the signaling information includes an NRT information,
   wherein the NRT service include one or more content items and a content item includes one or more files,
   wherein the NRT information includes information on capability codes,
   wherein the capability codes provides list of download protocols, forward error correction (FEC) algorithms, compression algorithms and media types,
   wherein the forward error correction (FEC) algorithms indicate whether or not Raptor algorithm is used,
   wherein the NRT information further includes information indicating whether support for capability represented by the capability code is essential to meaningful presentation of the NRT service or not,
   wherein the NRT information further includes information for signaling a corresponding 2D or 3D version of a current service component, and
   wherein the information for signaling a corresponding 2D or 3D version indicates a value of content linkage information of a corresponding 2D or 3D content.

* * * * *